US012647283B2

(12) United States Patent
Honji

(10) Patent No.: US 12,647,283 B2
(45) Date of Patent: Jun. 2, 2026

(54) SYSTEM AND METHOD FOR TRUSTED MEDIA ORIGINATION

(71) Applicant: Scott Honji, Highland, UT (US)

(72) Inventor: Scott Honji, Highland, UT (US)

( * ) Notice: Subject to any disclaimer, the term of this patent is extended or adjusted under 35 U.S.C. 154(b) by 133 days.

(21) Appl. No.: 18/423,811

(22) Filed: Jan. 26, 2024

(65) Prior Publication Data

US 2025/0247252 A1 Jul. 31, 2025

(51) Int. Cl.
*H04L 9/32* (2006.01)

(52) U.S. Cl.
CPC .................................. *H04L 9/3263* (2013.01)

(58) Field of Classification Search
None
See application file for complete search history.

(56) References Cited

U.S. PATENT DOCUMENTS

2017/0041306 A1* 2/2017 Stack ................... G06F 21/6218
2021/0209373 A1* 7/2021 Raspotnik, Jr. ......... H04L 63/08

* cited by examiner

*Primary Examiner* — Jeffrey C Pwu
*Assistant Examiner* — Mayasa A. Shaawat
(74) *Attorney, Agent, or Firm* — The Rapacke Law Group, P.A.

(57) ABSTRACT

A system for trusted media origination including a processor of a trusted media originator node communicatively connected to at least one at least one media source and a memory on which are stored machine-readable instructions that when executed by the processor, cause the processor to: acquire a media data instance from at least one media source; determine an identity of at least one Participating Actor in an origination event associated with the media data instance; verify the identity of the at least one Participating Actor in the origination event; generate a certificate representing the verified identity of the at least one Participating Actor; derive a plurality of features from the origination event, the verified identity of the at least one Participating Actor, and attributes and state of the media data instance; verify the plurality of the derived features; generate an origination event record data based on the verified plurality of the derived features; encode at least a portion of the origination event record data using an identification certificate of the at least one Participating Actor; acquire a media event journal corresponding to the media data instance; and enter the origination event record data and the identity of the at least one Participating Actor into the media event journal.

20 Claims, 7 Drawing Sheets

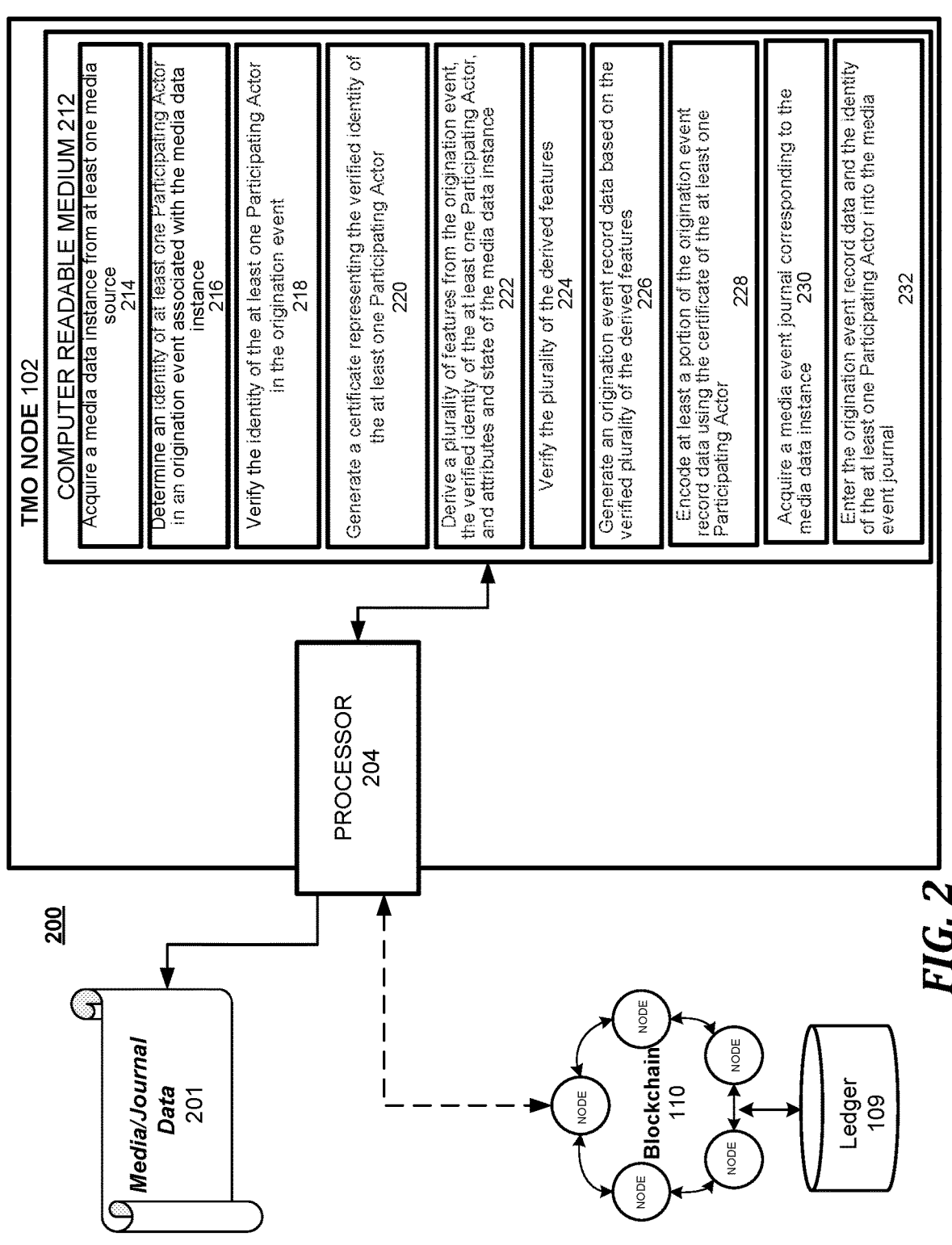

TMO NODE 102

COMPUTER READABLE MEDIUM 212

Acquire a media data instance from at least one media source
214

Determine an identity of at least one Participating Actor in an origination event associated with the media data instance
216

Verify the identity of the at least one Participating Actor in the origination event
218

Generate a certificate representing the verified identity of the at least one Participating Actor
220

Derive a plurality of features from the origination event, the verified identity of the at least one Participating Actor, and attributes and state of the media data instance
222

Verify the plurality of the derived features
224

Generate an origination event record data based on the verified plurality of the derived features
226

Encode at least a portion of the origination event record data using the certificate of the at least one Participating Actor
228

Acquire a media event journal corresponding to the media data instance
230

Enter the origination event record data and the identity of the at least one Participating Actor into the media event journal
232

PROCESSOR
204

*Media/Journal Data*
201

NODE
NODE
NODE
NODE
NODE
Blockchain
110

Ledger
109

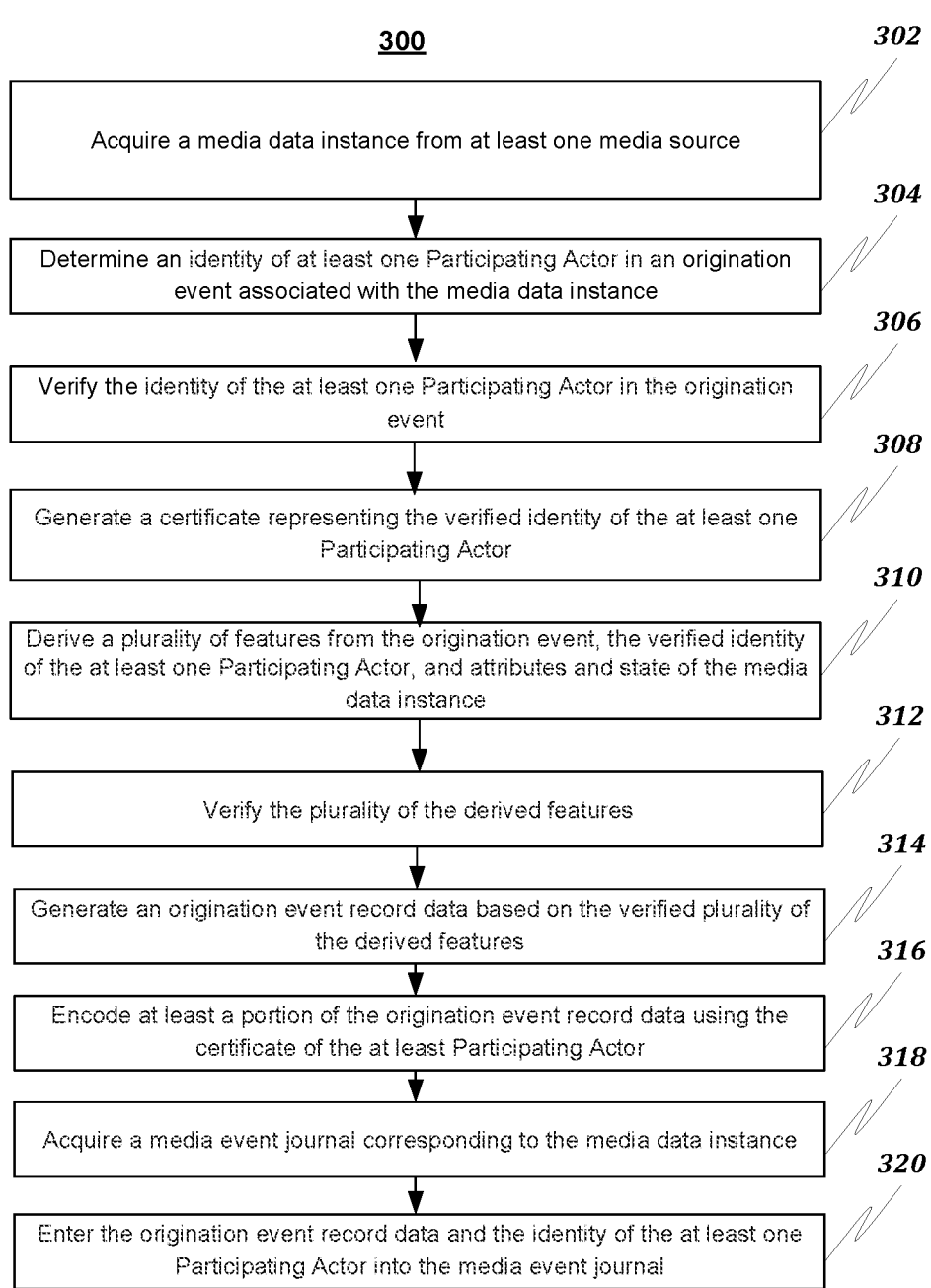

300

302

Acquire a media data instance from at least one media source

304

Determine an identity of at least one Participating Actor in an origination event associated with the media data instance

306

Verify the identity of the at least one Participating Actor in the origination event

308

Generate a certificate representing the verified identity of the at least one Participating Actor

310

Derive a plurality of features from the origination event, the verified identity of the at least one Participating Actor, and attributes and state of the media data instance

312

Verify the plurality of the derived features

314

Generate an origination event record data based on the verified plurality of the derived features

316

Encode at least a portion of the origination event record data using the certificate of the at least Participating Actor

318

Acquire a media event journal corresponding to the media data instance

320

Enter the origination event record data and the identity of the at least one Participating Actor into the media event journal

*FIG. 3A*

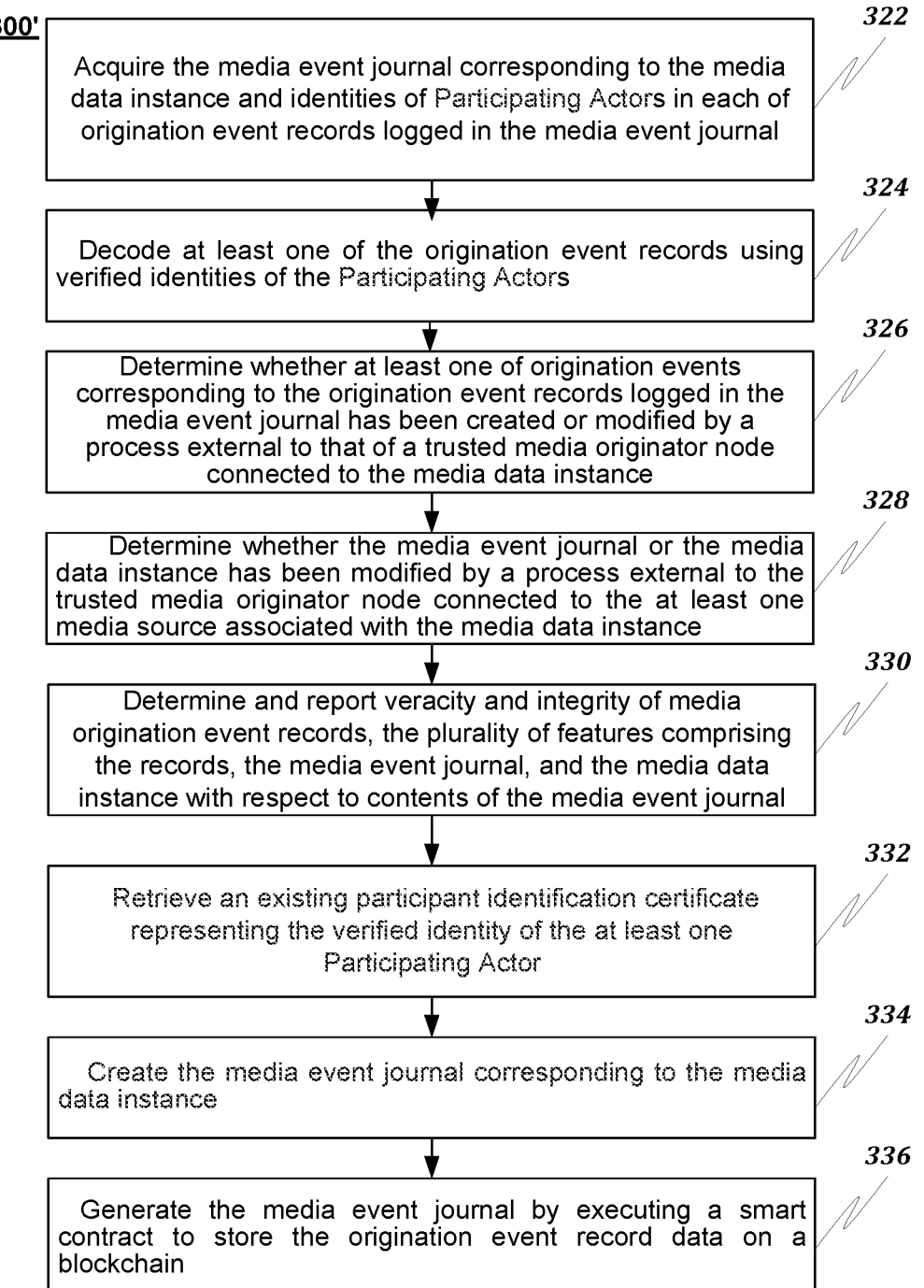

300'

322
Acquire the media event journal corresponding to the media data instance and identities of Participating Actors in each of origination event records logged in the media event journal 324
Decode at least one of the origination event records using verified identities of the Participating Actors 326
Determine whether at least one of origination events corresponding to the origination event records logged in the media event journal has been created or modified by a process external to that of a trusted media originator node connected to the media data instance 328
Determine whether the media event journal or the media data instance has been modified by a process external to the trusted media originator node connected to the at least one media source associated with the media data instance 330
Determine and report veracity and integrity of media origination event records, the plurality of features comprising the records, the media event journal, and the media data instance with respect to contents of the media event journal 332
Retrieve an existing participant identification certificate representing the verified identity of the at least one Participating Actor 334
Create the media event journal corresponding to the media data instance 336
Generate the media event journal by executing a smart contract to store the origination event record data on a blockchain

FIG. 3B

400
402
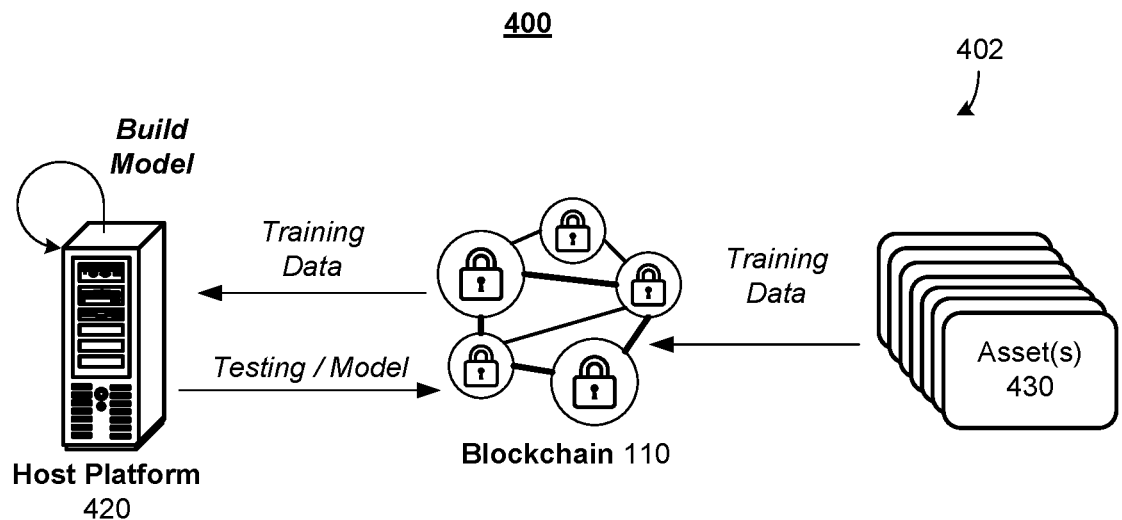
404
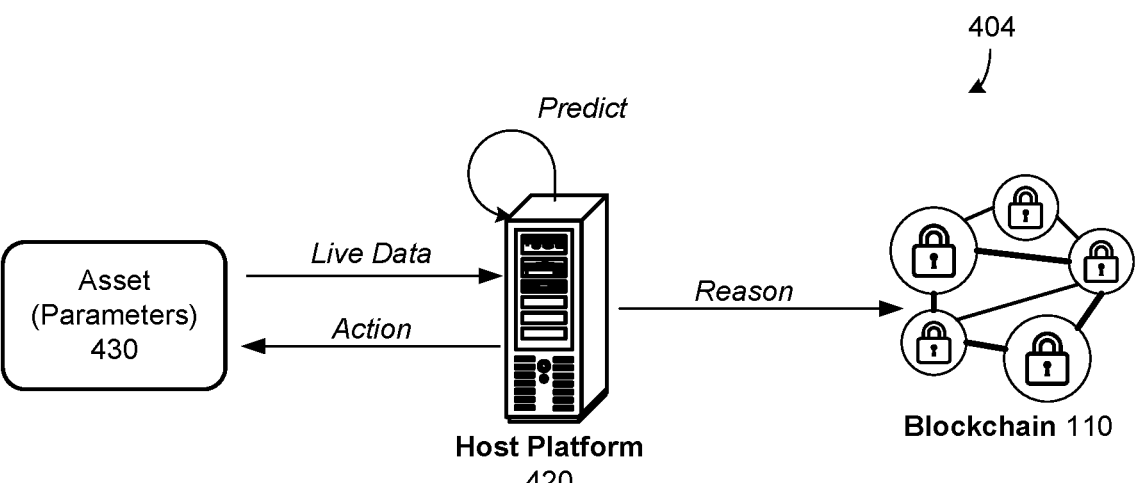
*FIG. 4*

SYSTEM AND METHOD FOR TRUSTED MEDIA ORIGINATION

FIELD OF DISCLOSURE

The present disclosure generally relates to verification of a digital media provided by an originating source, and more particularly, system and method for trusted media origination.

BACKGROUND

The process of creating, sharing or transmitting of various physical and digital media is used every moment by authors, transport services, data services, devices, and consumers. In the course of sharing or transmission, the media may be modified by a variety of means.

A variety of existing solutions are aimed at digital media change tracking and auditing. For example, U.S. Pat. No. 10,185,557 to Broadcom™ discloses a change management system that generates change records corresponding to changes to tracked documents and stores a master control file comprising metadata records that respectively correspond to the tracked documents and which comprise a tracked metadata field and a time field. Responsive to detecting that a change to a given document is of a predefined type, the tracked metadata field in the corresponding metadata record is modified, and the time field in that metadata record is updated accordingly. In response to a problem event, it is determined that the problem event relates to the given document, and, based on the time field, a subset of the change records is selected. Each change record in the subset corresponds to the given document. A problem change record is identified from the change records in the subset and used to revert the given document to a state previous to the problem event.

Another variation of digital media change management involves synchronization among multiple instances of the media or components thereof. For example, U.S. Patent Application No. 2005/091,283 to Microsoft™ discloses software for meta data associated with multiple pieces of content (e.g., songs, movies, other audio/video clips, etc.) stored on multiple pieces of media (e.g., CDs, DVDs, etc.) is maintained in a meta data store. The meta data store also includes meta data associated with other pieces of content stored elsewhere, such as songs stored in files on a local hard drive that have been ripped from a CD or DVD. These other pieces of content are associated with the content on the pieces of media, such as being ripped versions of the same song tracks. This association is maintained in the meta data store, so that whenever a change is made to meta data for one piece of content (e.g., for a track on a CD), then the meta data for the associated piece(s) is also changed (e.g., the ripped version stored in a file on the hard drive).

However, these and many others existing digital data verification solutions are not concerned with the identities of the authors, tools, services, and/or devices involved in significant events in the lifecycle of an evolving instance of digital media. In the Era of Artificial Intelligence (AI), important creative, academic, and journalistic media lack any indication of their origination nor the identities of the Actors participating in their creation, modification, or incorporation. In other words, if the original digital media data is modified by applications, services, or devices along its way to a recipient, the recipient has no way of knowing whether, how, by what services or tools or by whom the original media data has been modified. This may contribute to a deficit in trust that, once exploited in highly impactful ways, will expand into a general crisis given the nature and quality of the human or AI-based media modifications.

Accordingly, a method for trusted media origination including the generation, certification and verification of the identities of Actors corresponding to origination events that occur in the lifecycle of a digital media is desired. The method may be enhanced by an AI-based automated system and method for real-time verification of the identities of origination actors based on predictive analytics of the origination events and/or the media itself.

BRIEF OVERVIEW

This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

One embodiment of the present disclosure provides a system for trusted media origination including a processor of a trusted media originator node communicatively connected to at least one at least one media source and a memory on which are stored machine-readable instructions that when executed by the processor, cause the processor to: acquire a media data instance from at least one media source; determine an identity of at least one Participating Actor in an origination event associated with the media data instance; verify the identity of the at least one Participating Actor in the origination event; generate a certificate representing the verified identity of the at least one Participating Actor; derive a plurality of features from the origination event, the verified identity of the at least one Participating Actor, and attributes and state of the media data instance; verify the plurality of the derived features; generate an origination event record data based on the verified plurality of the derived features; encode at least a portion of the origination event record data using the identification certificate of the at least one Participating Actor; acquire a media event journal corresponding to the media data instance; and enter the origination event record data and the identity of the at least one Participating Actor into the media event journal.

Another embodiment of the present disclosure provides a method that includes one or more of: acquiring a media data instance from at least one media source; determining an identity of at least one Participating Actor in an origination event associated with the media data instance; verifying the identity of the at least one Participating Actor in the origination event; generating a certificate representing the verified identity of the at least one Participating Actor; deriving a plurality of features from the origination event, the verified identity of the at least one Participating Actor, and attributes and state of the media data instance; verifying the plurality of the derived features; generate an origination event record data based on the verified plurality of the derived features; encoding at least a portion of the origination event record data using an identification certificate of the at least one Participating Actor; acquiring a media event journal corresponding to the media data instance; and enter the origination event record data and the identity of the at least one Participating Actor into the media event journal.

Another embodiment of the present disclosure provides a computer-readable medium including instructions for: acquiring a media data instance from at least one media source; determining an identity of at least one Participating Actor in an origination event associated with the media data instance; verifying the identity of the at least one Participating Actor in the origination event; generating a certificate representing the verified identity of the at least one Participating Actor; deriving a plurality of features from the origination event, the verified identity of the at least one Participating Actor, and attributes and state of the media data instance; verifying the plurality of the derived features; generate an origination event record data based on the verified plurality of the derived features; encoding at least a portion of the origination event record data using an identification certificate of the at least one Participating Actor; acquiring a media event journal corresponding to the media data instance; and enter the origination event record data and the identity of the at least one Participating Actor into the media event journal.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings:

FIG. 2 illustrates a network diagram of a system including detailed features of a trusted media originator (TMO) node consistent with the present disclosure;

FIG. 3A illustrates a flowchart of a method for trusted origination of the digital media consistent with the present disclosure;

FIG. 3B illustrates a further flowchart of a method for trusted origination of the digital media consistent with the present disclosure;

FIG. 4 illustrates deployment of a machine learning model for media verification parameters using blockchain assets consistent with the present disclosure;

DETAILED DESCRIPTION

Figure 1A:
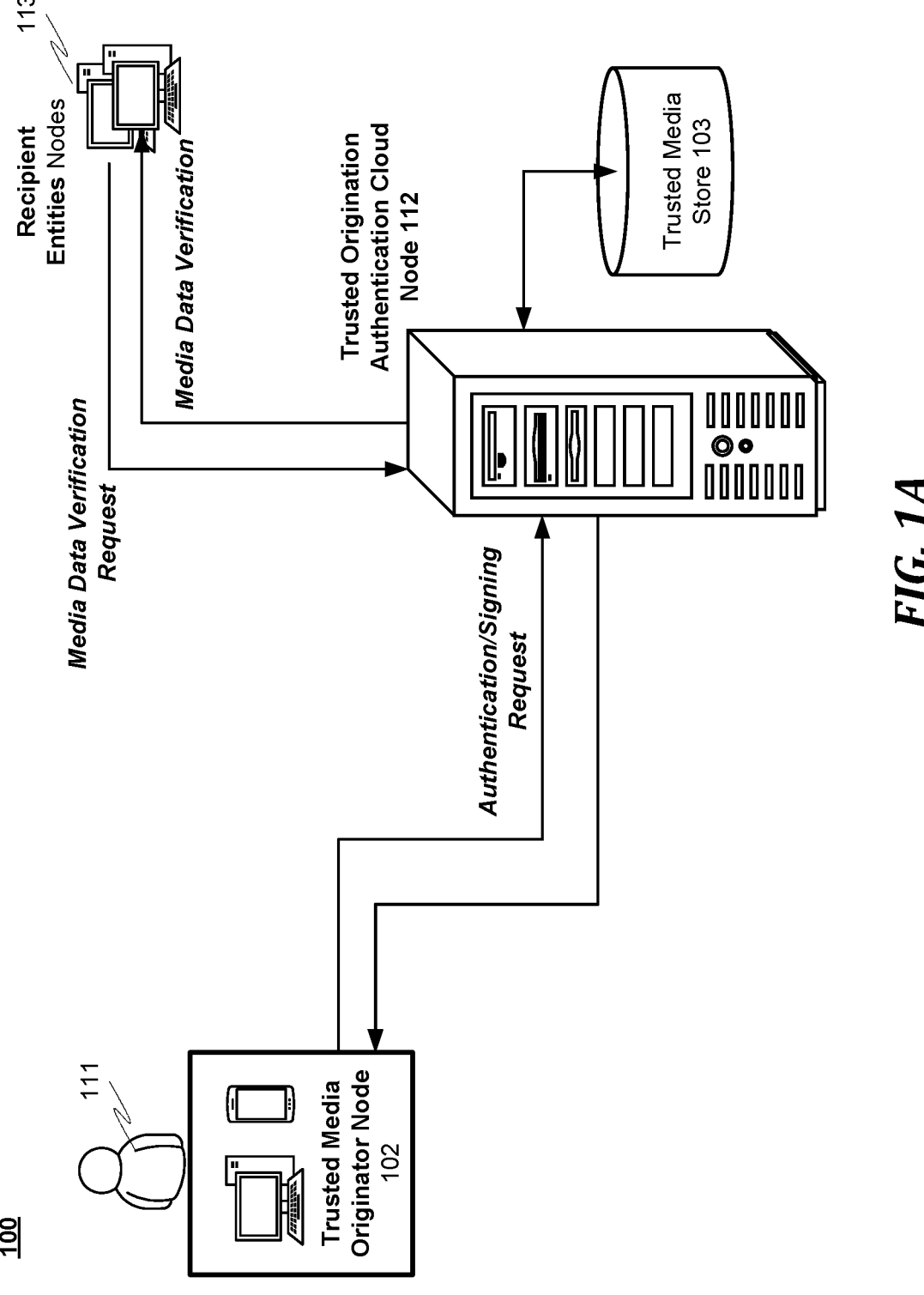
FIG. 1A illustrates a network diagram of a system for trusted origination and verification of the digital media consistent with the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such a term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, 16, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subject matter disclosed under the header.

The present disclosure includes many aspects and features. Moreover, while many aspects and features relate to, and are described in, the context of lead-based recommendations, embodiments of the present disclosure are not limited to use only in this context.

The present disclosure provides a system, method and computer-readable medium for trusted media origination. The disclosed embodiments may be enhanced by AI-based automated system and method for real-time verification of the identities of Origination Actors based on predictive analytics of the origination events and/or the media (digital or physical) itself.

In one embodiment, the system overcomes the limitations of existing data verification methods by employing fine-tuned machine learning models configured to produce media verification parameters that may be used for generation of a verification verdict. By leveraging the capabilities of the AI and machine learning, the disclosed approach offers a significant improvement over existing solutions discussed above in the background section.

The disclosed embodiments include a system, method and computer-readable medium designed to address the deficiencies in knowledge and trust in the origination, authenticity, and authorship of a digital media. The disclosed embodiments include creation and management of an auditable, chronologically ordered, and timestamped even journal that captures digital media origination information related to a specific instance and its associated derivatives of the digital media. In one embodiment, the verification system delves into the key components of the digital media data event journal, encompassing origination events, the chain of originators (including authors, tools, and devices) responsible for these events, and the relevant metadata specific to originators, events, and the event journal as a whole. The processing methods for generating and updating the media data origination journal with minimal or no manual intervention during media creation, modification, transformation, or incorporation into other media are detailed.

Additionally, the disclosed embodiments address cryptographic measures to ensure resilience against tampering or repudiation of originator information, origination event details, and the media itself. The system may explore the user experience and underlying processes for incorporating individual or organizational authorship information, including copyright, trademark, and licensing details, into a media instance through the origination journal.

The disclosed embodiments are geared to facilitating origination events for devices, operating systems, and software applications through both declarative and programmatic means. This includes the generation and addition of detailed origination events to a digital media instance. One disclosed embodiment provides a mechanism for displaying a journal of the digital media-related origination events in a discoverable and comprehensible form. For authors and creators, there is a mechanism to add authorship information, such as identity, copyright, trademark, licensing, and terms of use, to a digital media instance. Consumers also have access to a mechanism for displaying a discoverable and comprehensible journal of origination events for a digital media instance.

In the context of a cloud service, the disclosed system may optionally issue certificates to authors, applications, operating systems, and devices. The cloud service offers storage and retrieval services for certificates associated with private signing keys. It also centralizes the digital signing process by moving it away from the authoring/consuming device to a remote service that provides a private key storage. Additionally, the cloud service offers a remote service for the storage of origination journals and/or origination journal-equipped documents. This serves as a mechanism for hosting verified and fully documented originals, enabling the identification and challenge of unauthorized derivatives.

One embodiment also allows for the choice between embedded or remote origination journals, and the original journal updates can be processed either locally on the authoring device or remotely. Private keys and the signing process may be secured locally, through the cloud service, or via an originator service. Users also have the option to store origination journals and/or journal-equipped digital media originals remotely on the cloud service.

An Origination Journal may be implemented in embodied forms that include but are not limited to any or a combination of the following:

1. In a non-persistent form, such as in temporary device memory or the buffer of a transmitting or receiving device;
2. Embedded subdocument of the digital media;
3. As a standalone document residing on the same or different physical storage device or location relative to the media;
4. As a record or collection of records in a database residing on the same or different physical storage device(s) or location relative to the media;
5. As one or a collection of transactions recorded within a blockchain, with centralized access via the same or different physical device relative to that of the media, or decentralized access from multiple devices; and with non-distributed storage on the same or different physical storage device relative to that of the media, or distributed storage across multiple physical storage devices.

The Origination Journal or any part thereof may further be rendered to a form that restricts access to its contents to authorized entities using a method such as an asymmetric encryption. As discussed above, Origination Journal Events are key elements of the Origination Journal, each representing a significant event in the life cycle of a digital media data instance. The Origination Journal may contain zero to many Origination Journal Events. Each Origination Event possesses properties that include, but are not limited to:

Classification. An Origination Event's Classification is one of a small number of descriptive identifiers indicating the type of event that took place in the life cycle of the media instance. Each Event Classification possesses a specific and unique set of attributes and criteria for qualification. The particular Classification of a new Origination Event is determined by an Initiating Actor or the Origination Journaling Subsystem itself and, once committed, becomes part of the event's record in the Origination Journal. Examples of Origination Event Classifications are:

Created—media is being created;

Copied—a copy is being created from a source media;

Derived—an altered derivation is being created from a source media;

Modified—the media's content is being altered;

Transformed—the form and format of the media's content is changing;

Incorporated—the content of a secondary media is being incorporated into the primary media;

Transferred—authorship of the media is being transferred;

Discontinued—an Origination Journal was created and temporarily maintained for the media but was discontinued;

Attributes Updated—attributes of the digital media, including author-defined values pertaining to the media, such as title, notes, caption, author identity, terms of use, etc., are being modified; and Author Profile (Put, Get)—created with the option to generate a digital certificate—or retrieves author attributes.

Context. Every Origination Event takes place within a context that may be described by attributes that include but are not limited to date, time, and location. The Event's context is determined by the Origination Journaling Subsystem itself and becomes part of the Event's record in the Origination Journal.

Attributes. The Origination Event's attributes are the collection of descriptive values associated with the Event, according to its Context and Classification. Event attributes may:

be supplied by the initiating Actor;

be supplied by the Origination Journaling Subsystem itself; or assume the general form of key-value pair. Both, the key and value of each attribute supplied for the Event becomes part of the Event's record in the Origination Journal.

Origination Actors, alternatively referred to as Participating Actors, or simply Actors, are the set of logic entities that participate in the formation, certification, and verification of media Origination Events. Examples include:

Media capture devices (microphones, still/live action cameras. sensors, etc.) or software embedded therein;

A device hosting a capture device as a hardware subcomponent;

A software interface to a capture device, known in the art as a device driver;

An operating system on which the event takes place or a subcomponent thereof, such as the filesystem, the copy/paste facility, or other media sourcing or editing facility of or application packaged with the operating system;

Standalone media sourcing and editing applications and services;

Human media authors including individuals, institutions and organizations.

A single Origination Actor may act as the initiating source for an Origination Event. Alternatively, the Origination Journaling Subsystem itself may act as the initiator of an Origination Event.

Auxiliary Actors may be identified by or suggested to the journaling subsystem by the Event's Initiating Actor. Alternatively, the Origination Journaling system may itself identify Auxiliary Actors. The set of Origination Actors and the identities of each become part of the Event's record in the Origination Journal.

The Origination Role of each Origination Actor is recorded in the Origination Journal as a part of an Origination Event. Origination Roles include, but are not limited to:

Author—the certified author of the media;

Application;

Service;

Operating System;

Device;

Origination Actor Roles may have additional qualifiers, such as Role Type. One or more Role Type qualifiers may be combined with a Role fundamental as a new Role, or be employed as standalone, logically subordinate attribute(s) of a Role. Examples of Role Types include but are not limited to:

Individual, Organizational, or Institutional (Author Role);

Media Authoring, AI (Application and Service Roles);

Capture, Desktop, Mobile (Operating System and Device Roles).

Origination Actors may have additional identifying attributes, such as Pen Name and Locality (Author Role), Publisher and Version (Application, Service, and Operating System Roles), Model Name and Serial Number (Device Roles). Some attributes may be defined and enforced as mandatory by the Origination Journaling Subsystem or Service, others may be optional and/or defined by an Origination Actor.

An Origination Event is certified by each of the Events' Participating Actors prior to recording the Event in the journal. Certification can be implemented as an Actor-provided service, or by the Origination Journal Subsystem acting as a proxy. The input to an Actor's certification may include a full, condensed, or cryptographically hashed representation of the digital media, the Event's Context, Classification, additional attributes, and/or list of Actor identities. The output of each Actor's certification is a repudiation-resilient signature assuming any of several possible forms, such as an image of a human-authored signature in combination with personally identifying information for the Actor known in the art as a digital signature employing a digital certificate/private key pair, or other signing method or technology. The signature output is recorded in the digital media data journal along with the Event's content, Classification, additional attributes, and Actor identities.

The Origination Journal or any part thereof may be rendered to a human-readable form, a human-non-readable (e.g., binary) form, and/or a form that limits access to the Origination Journal's contents to only authorized entities. Limited access forms may employ encryption, remote storage protected by user authorization, other access limiting methods well known in the art, or a combination of the above.

The Origination Journaling Subsystem defines an application programming interface by which clients can make requests of and receive requests from the Origination Journaling Subsystem. An incomplete list of examples of such requests include:

Journal Policy and Level-of-Service (Get, Put) assigns or retrieves information that controls the behavior and level of service of the Origination Journaling Subsystem;

Origination Event (Get, Put) generates or retrieves an Origination Event record in the Journal;

Media and Journal Verification (Post) verifies the Media with respect to the contents of its associated Origination Journal and visa-versa;

Journal Query (Get) retrieves specific information about the Origination Journal as a whole, such as its unique Media Identifier, present status, or the value(s) of a particular attribute or set of attributes;

Journal Event Query (Get) retrieves specific information about a particular Origination Event, such as a particular Event attribute or set of attributes.

Journal Render (Get) retrieves a human-consumable rendition of the journal according to various client-defined criteria and in a particular client-selected format ranging from abbreviated to full, journal data only to CSS-styled HTML, and the like; and Origination Event Certification (Post) may be sent by the Origination Journaling Subsystem to an Origination Actor-provided service to certify or validate an Origination Event.

Each Origination Actor, including authors, may be called upon during Origination Journal processing to perform tasks in compliance with an Origination Actor Service Level Agreement, such as the following:

Given the parameters of an Origination Event, certify the Event by generating and returning a signature to the Origination Journal Subsystem;

Given the digest of a media instance and additional attributes of the media and associated Origination Journal, such as selected Context information and attributes of the most recent Origination Event; certify the media and Origination Journal by generating and returning a signature to the Origination Journal Subsystem;

Given the same inputs along with its signature, verify its signatures.

Such tasks require static assets, secure storage for these assets, service deployment and management, computational and other resources. Rather than provide and manage these resources themselves, Origination Actors may instead delegate their responsibilities to the Origination Journal Service to act as their proxy.

The Origination Journal Service may act as an Origination Actor Proxy by default when it can robustly and canonically identify and authenticate the Actor, for example, by using system APIs (including AI processing) to identify the hosting operating system, computing device, current user, etc., subject to Origination Journal Policy and Level of Service.

For an Origination Actor whose identity cannot be robustly and canonically identified or authenticated, the Actor may provide explicit permissions and applicable resources to the Origination Journal Service to act as its Proxy in various Origination Journal Transactions by such means as manual communication and asset transfer, or by sending an Origination Actor Proxy Request to the Origination Journal Service, etc.

An Origination Journal may be created by the Origination Journaling Subsystem in response to the first Origination Event (Put) Request sent by an initiating Origination Actor. Ideally and typically, this Event carries the Classification "Created", representing the creation and first persistence or initial transmission of the media. An Origination Journal may be created in response to successful recording of an Origination Event of Classification other than "Created," for example, "Attributes Updated."

An Origination Journal may be created by the Origination Journaling Subsystem in response to other requests types, such as requests to duplicate a journal along with its associated media, synchronize a local instance of media with its remote original, create an empty a journal, etc. The creation of the journal may be accompanied by the generation and recording of a globally unique value representing the digital media data instance, or a Media Identifier within the Origination Journaling Subsystem. The Media Identifier may be encoded as a part of the media's digital contents (e.g., as a watermark or signature), as a metadata attribute within the media document format's digital tagging framework, as an Origination Journal Attribute recorded in the Origination Journal, or any combination thereof depending on the media form factor, Origination Journal Policy and Level of Service, parameters passed to the Origination Event (Put) Request, or any combination thereof.

A newly created Origination Journal may assume any single or combination of forms described herein, depending on Origination Journal Policy, Settings and/or Level of Service, parameters passed to the Origination Event (Put) Request, or any combination thereof. The Origination Journal's Status may be established at the point of creation and maintained throughout its lifetime. Examples of the Journal Status include:

Incomplete—the initiating Event for the Origination Journal is not of Classification "Created", or the Origination Subsystem detects that the journal is missing one or more records, for example, if the media has been modified in a significant manner but lacks a corresponding "Modified" Event in the Journal;

Discontinued—the Origination Journal has been explicitly discontinued, as indicated by the presence of a Discontinued Event as its most recent Origination Event;

Complete—the Journal possesses a set of Origination Event records verified as complete, beginning with a "Created" and zero or more additional Origination Event records.

The precise order and inclusion of steps involved in Origination Journal Event processing provided below is determined by conditions subject to Origination Journal Policy, Level of Service, the request's parameters, and other applicable conditions. Within the workflow of an author producing, modifying or requesting an instance of digital media is a stage immediately prior to which the media sourcing component, application, or service persists and/or transmits the new or updated media to the author/requestor. At this stage, the component, application, or service may, depending on its own capabilities, the nature of the media, its own policy, Origination Journal Policy, and that of the user, ask the user via its own presentation affordances or that of the Origination Journal Management Subsystem whether to generate an Origination Event record in an existing or new Origination Journal for the media. Alternatively, collective policy may not present such an option to the user. Subsequent steps represent the continuation of Origination Event processing in either scenario.

The media sourcing component, application, or service or the Origination Journal Subsystem itself may provide an opportunity for the user to add or update Authorship attributes for the Event, depending on applicable Policy. If the user responds in the affirmative, the media sourcing component, application, or Original Journal Subsystem may send an Authorship Attribute Update Presentation request to the Origination Journal Subsystem, which in response, displays a form to the user that generates and accepts as user input Authorship Attribute values that will be applied as part of the processing of the Origination Journal Event.

Origination Event (PUT) Request. The media sourcing component, application, or service sends an Origination Event (Put) Request for the media to the Origination Journal Subsystem, supplying the following:

The identity and location of the instance of media to which the request applies:

The Classification of the Event;

Additional attributes applicable to the Event's Classification;

The identity of the initiating Actor;

Optionally, a list of the identities of auxiliary Actors;

Optionally, options that influence the manner in which the request is processed.

The Origination Event Request Parameters are validated according to the following conditions:

The value of each request parameter is complete and consistent with respect to other parameters;

The value of each request parameter is consistent and permissible with respect to the requested Event's Classification;

The identities of the Origination Actors are valid and corresponding certification resources, signing credentials, service endpoints, etc., are available;

Failure to satisfy such conditions may result in the Origination Event (Put) Request to abort processing with a failure result, depending on a nature and scope of the divergence from consistency and permissibility, Origination Journal Policy, Level of Service, parameters provided with the request, or any combination of these and potentially additional conditions.

The Origination Journaling Subsystem may supply additional Origination Actors to the request depending on request's Origination Event Classification, other request parameters, Origination Journal Policy and Level of Service, or any combination of these and potentially additional conditions. The Origination Journal Subsystem examines and generates a condensed value representing the contents of the media instance, known in the art as a digest (or a message digest), using one of various cryptographic hashing algorithms. The Origination Journal Subsystem may examine the media instance for the presence of a Media Identifier previously created by the Origination Journaling Subsystem embedded within the media instance's content.

The Origination Journal Subsystem determines whether an Origination Journal for the media instance already exists. This determination may involve a scan of the media itself for an embedded Origination Journal, a scan of the storage system of the media instance for a local Origination Journal, a request to a service providing lookup and/or storage for a remote Origination Journal, etc., or a combination thereof depending on a Journal Policy, Settings, and a Level Service, parameters provided by the request sender, the presence/absence of a Media Identifier, or any combination of these and potentially additional conditions.

If an Origination Journal for the media instance already exists, the media instance's content and Origination Journal is validated and verified according to the steps outlined herein. Validation or verification failures may cause processing to abort with a failure result or continue, depending on Origination Journal Policy, settings, Level of Service, parameters provided with the request, or any combination of these and potentially additional conditions. The Origination Event Request Parameters are further examined for the following conditions:

The value of each request parameter is complete and consistent with respect to other parameters;

The value of each request parameter is consistent and permissible with respect to the requested Event's Classification;

The value of each request parameter is consistent and permissible with respect to Origination Journal Policy and Level of Service;

The value of each request parameter is consistent with the current status, and authorship, and other attributes of the Origination Journal.

The value of each request parameter is consistent and permissible with respect to the Origination Events in and existing Journal. Failure to satisfy such conditions may result in the Origination Event (Put) Request to abort processing with a failure result, depending on Origination Journal Policy, Settings, Level of Service, parameters provided with the request, or any combination thereof.

If an Origination Journal for the media instance does not exist:

A new, unique Media Identifier is generated;

A new Origination Journal is created in uncommitted form;

The newly Media Identifier is added to the newly created Origination Journal.

The Origination Event's Classification, Context, attributes, and identities of the Origination Actors are finalized and curated as the parameters for an Origination Event Certification Request. An Origination Event Certification Request may be sent to each Origination Actor or processed internally by the Origination Journal Management system acting as Origination Actor Proxy, depending on the pre-established configuration of the Origination Actor. Each Actor or Actor Proxy certifies or denies Event certification in response to the request.

A denial of the Origination Event Certification Request by any of the Actors or their proxies results in failure of the Origination Event Request, leaving the Origination Journal in an "Incomplete" status. In this failure scenario, the sender of the Origination Event Request may or may not elect to continue with the persistence or transmission of the media instance's revision.

If all Origination Event Certification requests are successful, the signature output of the request is added to the Origination Event record, along with identifying attributes of the Origination Actor, including but not limited to Role and Role Type, without committing the record to the Journal. An Origination Journal Certification Request may be sent to each Origination Actor or processed internally by the Origination Journal Management system acting as Origination Actor Proxy, depending on the pre-established configuration of the Origination Actor. Each Actor or Actor Proxy certifies or denies Journal certification in response to the request.

A denial of the Origination Journal Certification Request by any of the Actors or their proxies results in failure of the Origination Event Request, which may leave the Origination Journal in "Incomplete" status depending on Origination Journal Policy, Level of Service, and the parameters of the request. By the same conditions, the sender of the Origination Event Request may be advised by the Origination Journal Subsystem not to continue with the persistence or transmission of the media instance's revision.

If all Origination Journal Certification requests are successful, the signatures of each successful request are added to the Origination Journal. If the Origination Event Request results in the creation of a new Origination Journal, the newly created Media Identifier is added to the Journal. At this stage, all or selected part(s) of the updated Origination Journal may be digitally signed, depending on Origination Journal Policy, Level of Service, and the parameters of the request. The updated Journal is committed to a persisted form according to Origination Journal Policy and Level of Service, parameters of the Origination Event Request, or any combination thereof.

Origination Event (Put) Request may be implemented as follows. Author-Driven Event Classification Processing may be executed. Aside from changes to the content itself, important events in the life cycle of a digital media data instance are changes initiated by but not limited to author(s) that affect media attributes. Whereas applications and services can record Origination Events in an Origination Journal programmatically using the Origination Journal Subsystem APIs, an individual, the Origination Journal Subsystem's presentation services provide a means for the individual, the organizational, and the institutional authors to do the same via manual steps with authentication safeguards.

Origination Author Identity, Profiles, and Digital Certificates are employed as follows. The following steps allow an individual, organizational, and institutional author establish an Author Identity and associated Author Profile using the Origination Journaling Subsystem's presentation services in combination with the Origination Journaling Service. On a computing device hosting an instance of the Origination Journaling Subsystem, a user may access the Subsystem's presentation services through a variety of means known in the art, such as:

Launching the Origination Journaling Subsystem as an executable application from the host system's command line interface, graphical user interface, system application launcher affordance, etc., and with or without the path and filename of the media instance. This action launches either the Origination Journaling Subsystem's graphical user interface embodiment of its presentation service or its command line embodiment, depending on the name of the executable used, and if a media file path and filename was used, loads the Origination Journal associated with the media instance.

Using a spatial input device such as the mouse or touchscreen, selecting an instance of digital media as displayed in the operating system's file manager, raising a contextual menu on the media instance using the appropriate input gesture, then selecting a menu option such as "Origination." This action launches the Origination Journaling Subsystem's graphical user interface embodiment of its presentation service after it loads the Origination Journal associated with the media instance.

From within the device's operating system shell, launching an instance of digital media whose filename extension is associated with the Origination Journaling Subsystem's executable application. This action launches the Origination Journaling Subsystem's graphical user interface embodiment of its presentation service after it loads the Origination Journal associated with the digital media data instance.

Within the Origination Journaling Subsystem's presentation services interface, the user may log in or create a user account using authentication and account creation, discovery, and authorization services and methods well established in the art. Canonical user identity information, such as email address and phone number may be gathered from the user and may be verified as a condition of account creation, according to methods well established in the art. The Origination Journal Service may generate and retain a unique User and Account Identifier, according to methods well established in the art. When a user logs into the Origination Journaling Subsystem, they are authenticated and granted authorized access to their user account according to methods well established in the art.

Once the user has acquired authorized access to their user account within the Origination Journaling Subsystem's presentation services interface, the user may create one or more Origination Author Profiles. The steps involved in creating and populating profile attribute fields are known in the art. The Origination Journal Service may generate and retain a unique Author Profile Identifier for the profile, according to methods well established in the art. The steps involved in a user creating, selecting, and interacting with an application or service under one of potentially multiple user profiles are also known in the art.

In addition to the canonically identifying user information collected as part of creating the user's account, each Origination Author Profile may consist of additional, user-provided attributes specifically relevant to media authorship, including, but not limited to:

Pen or Common Name;
  Organization Name;
  Locality (e.g., city);
  State or Province;
  Country;
  Contact Method (email, SMS messaging, none);
  For each Contact Method, Contact Option (public, private by Origination Journaling Service proxy, do not contact) may be available;
  Signature image;
  Profile Lifetime (time before expiry);
  For each Author Profile, the Origination Journaling Service may generate a digital certificate and/or cryptographic private key, depending on Origination Policy and Level of Service for the user's account and/or other applicable parameters. The Origination Journaling Subsystem and Origination Journaling Service may allow the user to designate a default Author Profile to be used by the Origination Journaling Subsystem to be used on all devices or on a particular device when the author is added as an Origination Actor for Origination Event Requests being processed on the device. Alternatively, the initiating Origination Actor or the Origination Journaling Subsystem's presentation service may prompt the user to log into or create a user account and manually select an author profile as an Origination Actor for Origination Events Requests being processed on the device, depending on Origination Policy, Level of Service, the parameters of the request, or any combination thereof.

When an author is included as an Origination Actor in an Origination Event Request, the Origination Journaling System may record an Author Profile Identifier and/or additional attributes thereof in the Origination Journal as part of the Event, and/or employ the signature image, digital certificate, and/or cryptographic private key associated with the profile to carry out or process certification and verification, and rendering tasks and requests.

Origination Attribute Profiles are implemented as follows. An individual, organization, or institution with a valid user account with the Origination Journaling Service may prepare and optionally retain Attribute profiles for later or just-in-time use in generating Origination Journal Event records in an Origination Journal, according to the following steps:

On a computing device hosting an instance of the Origination Journaling Subsystem, a user may access the Subsystem's presentation services and acquire authorized access to their user account, according to the steps outlined herein. Once the user has acquired authorized access to their user account within the Origination Journaling Subsystem's presentation services interface, the user may create one or more Attribute Profiles. In addition to the canonically identifying user information collected as part of creating the user's account, each Origination Attribute Profile may consist of additional, user-provided attributes specifically relevant to media terms-of-use, including, but not limited to:

Copyright(s);

Trademark(s);

Accreditations;

Full author list;

Edition;

Serial number;

Organization, institution, or standards-specific code, such as UPC, ISBN, etc.;

License—an optional link to a published intellectual property license;

Permissions—a list of specific permissions; and

Limitations: list of specific limitations.

The Origination Journaling Service may optionally, on the user's behalf, generate, retain, and assign a hyperlink to long-form attributes such as Accreditations, a license published elsewhere, a custom license based on the user-provided or user-selected permissions and limitations. The Origination Journaling Subsystem and Origination Journaling Service may allow the user to designate a default Attribute Profile to be used by the Origination Journaling Subsystem to use on all devices or on a particular device when the author is added as an Origination Actor for Origination Event Requests being processed on the device. Alternatively, the initiating Origination Actor or the Origination Journaling Subsystem's presentation service may prompt the user to log in to or create a user account and manually select an Attribute Profile for Origination Event (Put) Requests being processed on the device, depending on Origination Policy, Level of Service, the parameters of the request, or any combination thereof. When an author is included as an Origination Actor in an Origination Event Request, the Origination Journaling System may record an Attribute Profile Identifier as a reference to the profile and/or the attributes thereof in the Origination Journal as part of the Event.

Attributes Updated Event Classification is implemented as follows. An individual, organization, or institution with a valid user account with the Origination Journaling Service may prepare and optionally initiate an Origination Event (Put) Request with the "Attributes Updated" Event Classification on an Origination Journal for which an Author Profile in their account has been recorded as the most recent Origination Actor with the Author Role Type. The intent of the "Attributes Updated" classification is to modify author-specified attributes for the media instance as a whole. The specific order of the following steps may differ depending on Origination Policy, Level of Service, the embodiment of the Origination Journaling Subsystem presentation services used, request parameters, or any combination thereof. On a computing device hosting an instance of the Origination Journaling Subsystem, a user may access the Subsystem's presentation services and acquire authorized access to their user account, according to the steps outlined herein.

Following successful user authentication and authorization, the Origination Journaling Subsystem and/or Service determines the user/account identifier for the logged in user. The user may use the Origination Journaling Subsystem's presentation service to specify the media instance to which the "Attributes Updated" Origination Event (Put) request is to apply, according to the steps described herein. The Origination Journaling Subsystem and/or Service determines the Media Identifier for the media instance by examining its content and that of its associated Origination Journal, if one exists. If an Origination Journal for the media instance does not exist, it may be created in the course of common Origination Journal Event (Put) Request Processing. If an Origination Journal for the digital media data instance exists, the digital media data instance's content and Origination Journal is validated and verified according to the steps outlined herein. Validation or verification failures may cause request processing to abort with a failure result or continue, depending on Origination Journal Policy, Settings, Level of Service, parameters provided with the request, or any combination of these and potentially additional conditions.

The Origination Journaling Subsystem, which may operate in collaboration with the Origination Journaling Service, determines whether the user account of the logged in user is authorized to successfully complete an "Attributes Updated" Origination Event (Put) Request on the media instance. To do so, the Origination Journaling Subsystem and/or Service may employ one or a combination of algorithms, such as determining whether the Author Profile Identifier recorded in the most recent Origination Event containing an Origination Actor of Author Role belongs to the user account whose identifier was provided as a request parameter. Alternative algorithms may rely upon an access performance optimization, such as maintaining a copy of the most recent Author Profile Identifier as an attribute of the Origination Journal itself. Failure to successfully determine whether the user account of the logged in user is authorized to complete the "Attributes Updated" request for the media instance may result in the Origination Event (Put) Request to abort processing with a failure result.

Using the Origination Journaling Subsystem's presentation services interface, a user authorized to issue an "Attributes Updated" Origination Event (Put) Request may view and edit the Origination Journal's Origination Attributes for the media instance, and/or add new Origination Attributes. In a graphical user interface embodiment of the Origination Journal Subsystem's presentation interface, the user may select "Save" to save their additions and/or changes. In a command-line embodiment of the Origination Journal Subsystem's presentation interface, the user may submit an Attributes Update operator parameter, their user account credentials, a list of key-value pairs to serve as Origination Attributes, and perhaps other parameters with the command.

The Origination Journaling Subsystem prepares and begins the processing of an Origination Event (Put) Request according to the steps outlined in Origination Journal Event (Put) Request Processing, with the logged in user acting as the initiating Origination Actor in the "Author" Role, "Attributes Updated" as the Event Classification, the media's location and path User Account Identifier and new or revised Journal Attribute key-value pairs among the parameters. A new Origination Event with the "Attributes Updated" Classification is added and committed to the new or existing Origination Journal according to the steps outlined in Origination Journal Event (Put) Request Processing.

Transferred Event Classification is implemented as follows. An individual, organization, or institution with a valid user account with the Origination Journaling Service may prepare and optionally initiate an Origination Event (Put) Request with the "Transferred" Event Classification on an Origination Journal for which an Author Profile in their account has been recorded as the most recent Origination Actor with the Author Role Type. The intent of the "Transferred" Event Classification is to transfer authorship to another party. The specific order of the following steps may differ depending on Origination Policy, Level of Service, the embodiment of the Origination Journaling Subsystem presentation services used, request parameters, or any combination thereof. On a computing device hosting an instance of the Origination Journaling Subsystem, a user may access the Subsystem's presentation services and acquire authorized access to their user account, according to the steps outlined herein.

Following successful user authentication and authorization, the Origination Journaling Subsystem and/or Service determines the user/account identifier for the logged in user. The user may use the Origination Journaling Subsystem's presentation service to specify the media instance to which the "Transferred" Origination Event (Put) request is to apply, according to the steps described in Origination Journal Event (Put) Request Processing.

The Origination Journaling Subsystem and/or Service determines the Media Identifier for the media instance by examining its content and that of its associated Origination Journal, if one exists. If an Origination Journal for the media instance does not exist, it may be created in the course of common Origination Journal Event (Put) Request Processing. If an Origination Journal for the digital media instance data does exist, the digital media data content and Origination Journal is validated and verified according to the steps outlined in Validation and Verification of Media Content and Origination Journal. Validation or verification failures may cause request processing to abort with a failure result or continue, depending on Origination Journal Policy, Settings, Level of Service, parameters provided with the request, or any combination of these and potentially additional conditions. The Origination Journaling Subsystem, which may operate in collaboration with the Origination Journaling Service, determines whether the user account of the logged in user is authorized to successfully complete an "Transferred" Origination Event (Put) Request on the media instance. To do so, the Origination Journaling Subsystem and/or Service may employ one or a combination of algorithms, such as determining whether the Author Profile Identifier recorded in the most recent Origination Event containing an Origination Actor of Author Role belongs to the user account whose identifier was provided as a request parameter. Alternative algorithms may rely upon an access performance optimization, such as maintaining a copy of the most recent Author Profile Identifier as an attribute of the Origination Journal itself. Failure to successfully determine whether the user account of the logged in user is authorized to complete the "Transferred" request for the digital media data instance may result in the Origination Event (Put) Request to abort processing with a failure result.

Using the Origination Journaling Subsystem's presentation services interface, a user may specify and submit the party to which to transfer authorship of the media instance. The user may identify the receiving party by any or a combination of identifiers that include, but are not limited to:

Origination Journaling Service user account name;
Email address;
SMS phone number.

The Origination Journaling Subsystem may request confirmation of the request from the currently authorized user. The Origination Journaling Subsystem may process the "Transferred" Origination Event (Put) Request in a single- or multiple-stage manner, depending on the identifying of the authorized user(s) acting in the roles of transferor and transferee, whether the transferee has a current and valid user account with the Origination Journaling Service, the Origination Policy and Level of Service either or both of parties' parameters provided with the request, other factors, or any combination thereof.

In single-stage processing of the "Transferred" Origination Event (Put) Request, the Event may be recorded to the Origination Journal immediately according to the processing details provided in Origination Journal Event (Put) Request Processing. In multiple-stage processing of the "Transferred" Origination Event (Put) Request, an interim Origination Event with "Transfer Requested" classification may be recorded to the Origination Journal immediately according to the processing details provided in Origination Journal Event (Put) Request Processing, followed by:

The Origination Journaling Subsystem or Service provides a link or copy of the media instance with a notification to the transfer recipient that a transfer of authorship for the media instance has been initiated, and requests their approval to receive authorship.

If the transfer recipient rejects authorship or does not respond within a time frame dependent upon Origination Policy or Level of Service of the transferer, the Origination Journal Subsystem and/or Service may record an event in the Origination Journal for the media instance to this effect.

If the transfer recipient accepts authorship, the Origination Journal Subsystem's presentation system may request the recipient first create and/or log in to their account with the Origination Journal Service according to the steps outlined herein. Following successful user authentication and authorization, the presentation services of the Origination Journaling Subsystem and/or Service may request that the recipient create or select the Author Profile and/or Attribute profile to record as part of or concomitantly with the "Transferred" Origination Event (Put) Request in the Origination Journal for the digital media data instance. The Origination Journaling Subsystem and/or Service next records the "Transferred" Origination Event (Put) Request in the Origination Journal for the affected media instance(s) according to the processing details provided in Origination Journal Event (Put) Request Processing. The Origination Journaling Subsystem and/or Service may subsequently notify the original requestor that the "Transferred" Origination Event (Put) Request has been successfully transferred.

Validation and Verification of Media Content and Origination Journal may be implemented as follows. The Validation and Verification of a digital media data instance's content and Origination Journal may be invoked as part of the processing of other operations and/or requests by the Origination Journaling Subsystem, alone, via, or in collaboration with the Origination Journaling Service, or in the processing of an explicit Media and Journal Verification Request. The specific order of the steps involved in Media and Journal Verification may differ depending on Origination Policy, Level of Service, the embodiment of the Origination Journaling Subsystem presentation services used, request parameters, or any combination thereof. The Origination Journal Subsystem examines and generates a condensed value representing the contents of the media instance, known in the art as a digest, using one of various mathematical or cryptographic hashing algorithms. The Origination Journal Subsystem examines the media instance for the presence of a Media Identifier previously created and embedded within the media instance's content by the Origination Journaling Subsystem, for example, as a metadata entry supported by the media's format, as a watermark, etc. or a combination thereof.

The Origination Journal Subsystem determines the existence of, conditionally decrypts, accesses, and examines the Origination Journal corresponding to the content digest and/or Media Identifier for the digital media data instance. If no such Origination Journal exists, decryption or access fails, the validation and verification processing is aborted with an error response. The Origination Journal Subsystem validates the structural integrity and internal consistency of the Journal and the Origination Event records of which it is comprised. If the Journal fails validation for structural integrity or internal consistency, the response will include an indication of this condition, and further validation and verification processing may abort or continue depending on Origination Policy and Level of Service, parameters to the request, other contextual factors, or a combination thereof. The Origination Journal Subsystem determines whether the Journal has been tampered with by computing a condensed value representing the contents of the Journal itself, i.e., the Journal Digest, and compare this to the value stored within the Journal. If the values do not match, the response will include an indication of this condition and further validation and verification processing may abort or continue depending on Origination Policy and Level of Service, parameters to the request, other contextual factors, or a combination thereof.

The Origination Journal Subsystem determines whether the media instance's content has changed since the last Origination Event was recorded by comparing the media content digest with that stored in the most recent Event. If the values do not match, the response will include an indication of this condition. Further validation and verification processing may abort or continue depending on Origination Policy and Level of Service, parameters to the request, other contextual factors, or a combination thereof. The Origination Journal Subsystem determines whether the certifications of the media instance's content by the Origination Actors of the most recent Origination Event are valid. This may involve a cryptographic validation of each Actor's digital signature of the media instance's content using a verified instance of their digital certificates, validation that the Actor's signature image or condensed rendition thereof recorded within the most recent Event is intact, matches that retained by the Origination Journaling Subsystem and/or Service, and has not been tampered with, etc. If certification of the digital media data instance's content by any of the Origination Actors of the most recent Origination Even fails verification, the response will include an indication of this condition. Further validation and verification processing may abort or continue depending on Origination Policy and Level of Service, parameters to the request, other contextual factors, or a combination thereof.

For each Origination Event of which the Origination Journal is comprised of or a subset thereof, the Origination Journal Subsystem may determine whether the certifications of the Event by each of its Actors are valid. This may involve cryptographic validation of each Actor's digital signature of the Event's content using a verified instance of their digital certificates, validation that the Actor's signature image or condensed rendition thereof recorded within the most recent Event is intact, matches that retained by the Origination Journaling Subsystem and/or Service, and has not been tampered with, etc. If certification of the Event's content by any of its Origination Actors fails verification, the response will include an indication of this condition. Further validation and verification processing may abort or continue depending on Origination Policy and Level of Service, parameters to the request, other contextual factors, or a combination thereof.

The disclosed embodiments may implement the following functionality:

Journal Query (Get) Request Processing;

Journal Event Query (Get) Request Processing;

Journal Render (Get) Request Processing; and

Author Profile (Put, Get).

In one embodiment of the present disclosure, the system provides for AI and machine learning (ML)-generated verification parameters based on analysis of digital media data and associated media data event journal-related data. In one embodiment, the proposed system functions as a media verification management tool based on real-time demands and pre-defined verification parameters that may be provided by the AI/ML models.

The disclosed embodiments may be platform agnostic. The disclosed system, advantageously, seamlessly integrates with a multitude development tools, enabling users to manage applications through a singular media event journaling interface.

In one embodiment, an automated digital media verification prediction model may be generated to provide for the digital media verification parameters associated with a current digital media data instance based on the current media data event journal-related data. The automated digital media data verification prediction model may use historical digital media data and associated media event journal data collected at the current location and at third-party verification locations of the same type located within the same development network or even located globally. The relevant digital media event journal-related data may include data related to other media originator source entities having the same (or similar within a pre-set range) parameters.

In one disclosed embodiment, the AI/ML technology may be combined with a blockchain technology for secure use of the digital media event journal-related data. A blockchain consensus mechanism may be implemented where multiple nodes or instances of the system validate the digital media data instance for a particular media originator source entity. This approach not only provides an additional layer of verification, but also reduces dependency on local databases.

In one embodiment, the trusted media originator entities may be connected to Trusted Origination Authentication Cloud Node over a blockchain network to achieve a consensus prior to executing a transaction to release the verification verdict/decision data for the digital media data instance based on the verification parameters produced by the AI/ML module.

In one embodiment, the digital media data verification recommendations may be produced directly on a granular level based on digital media data event journal input-associated digital data according to the AI-based predictive analysis and the processing/verification recommendations (based on predictive digital media data verification parameters). This process includes a transparent recommendations/verdicts mechanism that may be coupled with a secure communications chat channel (implemented over a blockchain network) which supports all clients of the digital media verification management service. In one embodiment, the secure chat channel may be implemented using a chat Bot.

FIG. 1A illustrates an exemplary network diagram of a system for trusted origination and verification of the digital media consistent with the present disclosure.

Figure 1B:
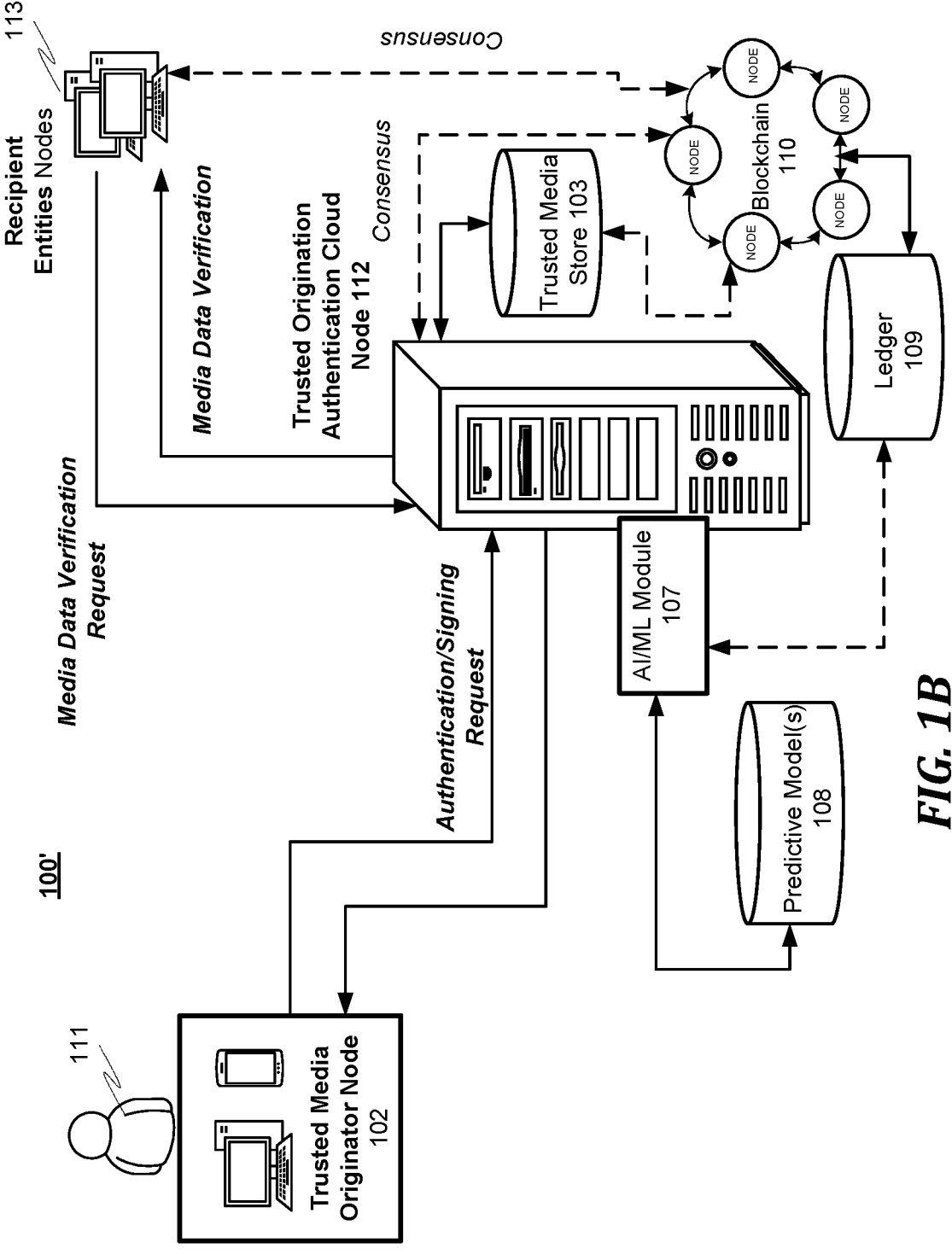
FIG. 1B illustrates a network diagram of a system for trusted origination and verification of the digital media using AI-based automated verification of the digital media based on predictive analytics of media event-related data employing a blockchain consistent with the present disclosure.

FIG. 1B illustrates a network diagram of a system for trusted origination and verification of the digital media using AI-based automated verification of the digital media based on predictive analytics of media event-related data employing a blockchain consistent with the present disclosure.

Referring to FIG. 1A, the example network 100 includes the Trusted Origination Authentication Cloud node 112 connected to recipient entities nodes 113 over network. The Trusted Origination Authentication Cloud node 112 may receive digital media data authentication/signing request from the Trusted Media Originator (TMO) node 102 that may be associated with an originating user (i.e., Participating Actor) 111. In one embodiment, the digital media data is associated with a digital media data event journal data. Note that digital media data event journal may be accessed and serviced on the same processing TMO node 102 or remotely (not shown) relative to the media data instance.

The recipient entities nodes 113 may receive media data associated with the media data event journal originated at the TMO node 102. The recipient entities nodes 113 may send media data verification request to the Trusted Origination Authentication Cloud node 112 for verification of the media data using the media data itself and the media data event journal data. In one embodiment, the Trusted Origination Authentication Cloud node 112 may query data from a trusted media store 103 for verification of the media data.

FIG. 1B illustrates a network diagram of a system for trusted origination and verification of the digital media using AI-based automated verification of the digital media based on predictive analytics of media event-related data employing a blockchain consistent with the present disclosure.

Referring to FIG. 1B, the example network 100' includes the Trusted Origination Authentication Cloud node 112 connected to recipient entities nodes 113 over network. The Trusted Origination Authentication Cloud node 112 may receive digital media data authentication/signing request from the Trusted Media Originator (TMO) node 102 that may be associated with an originating user (i.e., a Participating Actor) 111. In one embodiment, the digital media data is associated with a digital media data event journal data. Note that digital media data event journal may be accessed and serviced on the same processing TMO node 102 or remotely (not shown) relative to the media data instance.

The recipient entities nodes 113 may receive media data associated with the media data event journal originated at the TMO node 102. The recipient entities nodes 113 may send media data verification request to the Trusted Origination Authentication Cloud node 112 for verification of the media data using the media data itself and the media data event journal data. In one embodiment, the Trusted Origination Authentication Cloud node 112 may query data from a trusted media store 103 for verification of the media data.

Referring to FIG. 1B, the example network 100" further includes the Trusted Origination Authentication Cloud Node 112 configured to host an AI/ML module 107.

In one embodiment, the digital media data and associated digital media data event journal data to be verified may be processed by the Trusted Origination Authentication Cloud Node 112 using the pre-trained large language models (LLMs) to derive a language indicator and to parse out the data of the Participating Actor 111 based on the language indicator metadata. In other words, the key features of the digital media data may be derived based on the language of the digital media data in case when the digital media data includes textual or audible parameters.

The Trusted Origination Authentication Cloud Node 112 may query a local journal data database for the historical trusted media data 103 associated with the current digital media data instance. The Trusted Origination Authentication Cloud Node 112 may acquire relevant historical remote journal data (not shown) from a remote database residing on a cloud server of a third-party verification system(s). The remote journal data may be collected from other verification servers or facilities. The remote journal data may be collected from the trusted originator nodes similar to the TMO node 102 based on, for example, data types, author types, IP addresses, language or locations, URLs, email addresses, etc. as the trusted media data 103 that is associated with the current digital media data instance.

In one exemplary embodiment, The Trusted Origination Authentication Cloud Node 112 may generate a feature vector or classifier based on the received digital media data and the event journal data associated with digital media data and the collected event journal data (i.e., the pre-stored trusted media data 103 and the remote journal data). The features derived for the classifier may be indicative of digital media data tampering and requested/triggered verification procedures.

The Trusted Origination Authentication Cloud Node 112 may ingest the feature vector/classifier into an AI/ML module 107. The AI/ML module 107 may generate a predictive model(s) 108 based on the feature vector to predict verification parameters for automatically generating a verification verdict. As discussed above, the verification parameters may be further analyzed by the Trusted Origination Authentication Cloud Node 112 to produce the most accurate verification verdict.

The AI/ML module 107 may generate a predictive model (s) 108 to predict the digital media data verification parameters in response to the specific relevant pre-stored media data event-related data acquired from the blockchain 110 ledger 109. This way, the current verification parameters may be predicted based not only on the current media data and media event journal-related data, but also based on the previously collected heuristics and event journal-related data associated with the given digital media data instance and the current verification parameters provided by the AI/ML module 107. This way, the most optimal way of digital media data verification orchestration may be employed and recorded on the blockchain 110 ledger 109 for future references.

FIG. 2 illustrates a network diagram of a system including detailed features of the Trusted Media Originator (TMO) Node 102 consistent with the present disclosure.

Referring to FIG. 2, the example network 200 includes the TMO node 102 (see FIGS. 1A-B) configured to originate media data and media data event journal. As discussed above, the even journal data may be recorded and/or retrieved from the ledger 109 of the blockchain 110.

While this example describes in detail only one TMO node 102, multiple such nodes may be connected to the network and/or to the blockchain 110. It should be understood that the TMO node 102 may include additional components and that some of the components described herein may be removed and/or modified without departing from a scope of the TMO node 102 disclosed herein. The TMO node 102 may be a computing device or a server computer, or the like, and may include a processor 204, which may be a semiconductor-based microprocessor, a central processing unit (CPU), an application specific integrated circuit (ASIC), a field-programmable gate array (FPGA), and/or another hardware device. Although a single processor 204 is depicted, it should be understood that the TMO node 102 may include multiple processors, multiple cores, or the like, without departing from the scope of the TMO node 102 system.

The TMO node 102 may also include a non-transitory computer readable medium 212 that may have stored thereon machine-readable instructions executable by the processor 204. Examples of the machine-readable instructions are shown as 214-232 and are further discussed below. Examples of the non-transitory computer readable medium 212 may include an electronic, magnetic, optical, or other physical storage device that contains or stores executable instructions. For example, the non-transitory computer readable medium 212 may be a Random-Access memory (RAM), an Electrically Erasable Programmable Read-Only Memory (EEPROM), a hard disk, an optical disc, or other type of storage device.

The processor 204 may fetch, decode, and execute the machine-readable instructions 214 to acquire a media data instance from at least one media source. The processor 204 may fetch, decode, and execute the machine-readable instructions 216 to determine an identity of at least one Participating Actor in an origination event associated with the media data instance. The processor 204 may fetch, decode, and execute the machine-readable instructions 218 to verify the identity of the at least one Participating Actor in the origination event. The processor 204 may fetch, decode, and execute the machine-readable instructions 220 to generate a certificate representing the verified identity of the at least one Participating Actor.

The processor 204 may fetch, decode, and execute the machine-readable instructions 222 to derive a plurality of features from the origination event, the verified identity of the at least one Participating Actor, and attributes and state of the media data instance. The 1 processor 204 may fetch, decode, and execute the machine-readable instructions 224 to verify the plurality of the derived features. The processor 204 may fetch, decode, and execute the machine-readable instructions 226 to generate an origination event record data based on the verified plurality of the derived features.

The processor 204 may fetch, decode, and execute the machine-readable instructions 228 to encode at least a portion of the origination event record data using an identification certificate of the at least one Participating Actor. The processor 204 may fetch, decode, and execute the machine-readable instructions 230 to acquire a media event journal corresponding to the media data instance. The processor 204 may fetch, decode, and execute the machine-readable instructions 232 to enter the origination event record data and the identity of the at least one Participating Actor into the media event journal.

In one embodiment, the permissioned blockchain 110 may be configured to use one or more smart contracts that manage transactions for multiple participating nodes and for recording the transactions on the ledger 109. The media event journal may be constructed by recording each of the media origination events on a ledger 109 of the blockchain 110. This way, the blockchain 110 audit log essentially represents the media origination event journal consisting of consecutive encrypted blocks (or assets). Accordingly, any transaction that adds or modifies the existing asset is also recorded on the blockchain and becomes a part of the media event journal. As discussed above, the media event journal may be implemented off-chain and may be stored locally on persistent storage media or remotely on a cloud. In one embodiment, the entire journal generated off-chain may be recorded on the blockchain for higher security of the storage and anonymity.

As discussed above, the TMO node 102 may ensure a faster, more tailored response to the digital media data verifications and event journal entries. Local datasets such as certificates, event journals, etc. may be optionally recorded on a private (permissioned) blockchain 110. This provides a tamper-evident log of events and verifications enhancing security and transparency. The blockchain log may also contain a trail of how the ML models 108 (FIG. 1B) have been trained and evolved over time, which offers an auditable history of model adjustments and training.

FIG. 3A illustrates a flowchart of a method for trusted origination of the digital media consistent with the present disclosure.

Referring to FIG. 3A, the method 300 may include one or more of the steps described below. FIG. 3A illustrates a flow chart of an example method executed by the TMO node 102 (see FIG. 2). It should be understood that method 300 depicted in FIG. 3A may include additional operations and that some of the operations described therein may be removed and/or modified without departing from the scope of the method 300. The description of the method 300 is also made with reference to the features depicted in FIG. 2 for purposes of illustration. Particularly, the processor 204 of the TMO node 102 may execute some or all of the operations included in the method 300.

With reference to FIG. 3A, at block 302, the processor 204 may acquire a media data instance from at least one media source. At block 304, the processor 204 may determine an identity of at least one Participating Actor in an origination event associated with the media data instance. At block 306, the processor 204 may verify the identity of the at least one Participating Actor in the origination event. At block 308, the processor 204 may generate a certificate representing the verified identity of the at least one Participating Actor. At block 310, the processor 204 may derive a plurality of features from the origination event, the verified identity of the at least one Participating Actor, and attributes and state of the media data instance. At block 312, the processor 204 may verify the plurality of the derived features. At block 314, the processor 204 may generate an origination event record data based on the verified plurality of the derived features.

At block 316, the processor 204 may encode at least a portion of the origination event record data using an identification certificate of the at least one Participating Actor. At block 318, the processor 204 may acquire a media event journal corresponding to the media data instance. At block 320, the processor 204 may enter the origination event record data and the identity of the at least one Participating Actor into the media event journal.

FIG. 3B illustrates a further flowchart of a method for trusted origination of the digital media consistent with the present disclosure.

Referring to FIG. 3B, the method 300' may include one or more of the steps described below. FIG. 3B illustrates a flow chart of an example method executed by the TMO node 102 (see FIG. 2). It should be understood that method 300' depicted in FIG. 3B may include additional operations and that some of the operations described therein may be removed and/or modified without departing from the scope of the method 300'. The description of the method 300' is also made with reference to the features depicted in FIG. 2 for purposes of illustration. Particularly, the processor 204 of the TMO node 102 may execute some or all of the operations included in the method 300'.

With reference to FIG. 3B, at block 322, the processor 204 may acquire the media event journal corresponding to the media data instance and identities of Participating Actors in each of origination event records logged in the media event journal. At block 324, the processor 204 may decode at least one of the origination event records using verified identities of the Participating Actors. At block 326, the processor 204 may determine whether at least one of origination events corresponding to the origination event records logged in the media event journal has been created or modified by a process external to that of a trusted media originator node connected to the media data instance.

At block 328, the processor 204 may determine whether the media event journal or the media data instance has been modified by a process external to the trusted media originator node connected to the at least one media source associated with the media data instance. At block 330, the processor 204 may determine and report veracity and integrity of media origination event records, the plurality of features comprising the records, the media event journal, and the media data instance with respect to contents of the media event journal. At block 332, the processor 204 may retrieve an existing certificate representing the verified identity of the at least one Participating Actor. At block 334, the processor 204 may create the media event journal corresponding to the media data instance. At block 336, the processor 204 may generate the media event journal by executing a smart contract to store the origination event record data on a blockchain. Each of the origination event records logged in the media event journal may be certified by corresponding Participating Actors.

In one exemplary embodiment, the digital media data verification parameters' model may be generated by the AI/ML module 107 that may use training data sets to improve accuracy of the prediction of the verification parameters for the recipient entities 113 (FIG. 1A). The verification parameters used in training data sets may be stored in a centralized local database (such as one used for storing local event journal data 103 depicted in FIG. 1A). In one embodiment, a neural network may be used in the AI/ML module 107 for the predictive verification parameters modeling.

In another embodiment, the AI/ML module 107 may use a decentralized storage such as a blockchain 110 (see FIG. 1B) that is a distributed storage system, which includes multiple nodes that communicate with each other. The decentralized storage includes an append-only immutable data structure resembling a distributed ledger capable of maintaining records between mutually untrusted parties. The untrusted parties are referred to herein as peers or peer nodes. Each peer maintains a copy of the parameter(s) records and no single peer can modify the records without a consensus being reached among the distributed peers. For example, the peers 113, 102 and 112 (FIG. 1B) may execute a consensus protocol to validate blockchain 110 storage transactions, group the storage transactions into blocks, and build a hash chain over the blocks. This process forms the ledger 109 by ordering the storage transactions, as is necessary, for consistency. In various embodiments, a permissioned and/or a permissionless blockchain can be used. In a public or permissionless blockchain, anyone can participate without a specific identity. Public blockchains can involve assets and use consensus based on various protocols such as Proof of Work (PoW). On the other hand, a permissioned blockchain provides secure interactions among a group of entities which share a common goal such as storing lead response parameters for efficient handling of leads, but which do not fully trust one another.

This application utilizes a permissioned (private) blockchain that operates arbitrary, programmable logic, tailored to a decentralized storage scheme and referred to as "smart contracts" or "chaincodes." In some cases, specialized chaincodes may exist for management functions and parameters which are referred to as system chaincodes. The application can further utilize smart contracts that are trusted distributed applications which leverage tamper-proof properties of the blockchain database and an underlying agreement between nodes, which is referred to as an endorsement or endorsement policy. Blockchain transactions associated with this application can be "endorsed" before being committed to the blockchain while transactions, which are not endorsed, are disregarded. An endorsement policy allows chaincodes to specify endorsers for a transaction in the form of a set of peer nodes that are necessary for endorsement. When a client sends the transaction to the peers specified in the endorsement policy, the transaction is executed to validate the transaction. After a validation, the transactions enter an ordering phase in which a consensus protocol is used to produce an ordered sequence of endorsed transactions grouped into blocks.

In the example depicted in FIG. 4, a host platform 420 (such as the TMO node 102) builds and deploys a machine learning model for predictive monitoring of assets 430. Here, the host platform 420 may be a cloud platform, an industrial server, a web server, a personal computer, a user device, and the like. Assets 430 can represent event journal-related parameters. The blockchain 110 can be used to significantly improve both a training process 402 of the machine learning model and the verification parameters' predictive process 405 based on a trained machine learning model. For example, in 402, rather than requiring a data scientist/engineer or other user to collect the data, historical data (heuristics—i.e., event journals'-related data) may be stored by the assets 430 themselves (or through an intermediary, not shown) on the blockchain 110.

This can significantly reduce the collection time needed by the host platform 420 when performing predictive model training. For example, using smart contracts, data can be directly and reliably transferred straight from its place of origin (e.g., from the TMO node 102 or from even journals' databases 103 and remote databases in FIG. 1B) to the blockchain 110. By using the blockchain 110 to ensure the security and ownership of the collected data, smart contracts may directly send the data from the assets to the entities that use the data for building a machine learning model. This allows for sharing of data among the assets 430. The collected data may be stored in the blockchain 110 based on a consensus mechanism. The consensus mechanism pulls in (permissioned nodes) to ensure that the data being recorded is verified and accurate. The data recorded is time-stamped, cryptographically signed, and immutable. It is therefore auditable, transparent, and secure.

Furthermore, training of the machine learning model on the collected data may take rounds of refinement and testing by the host platform 420. Each round may be based on additional data or data that was not previously considered to help expand the knowledge of the machine learning model. In 402, the different training and testing steps (and the data associated therewith) may be stored on the blockchain 110 by the host platform 420. Each refinement of the machine learning model (e.g., changes in variables, weights, etc.)

may be stored on the blockchain 110. This provides verifiable proof of how the model was trained and what data was used to train the model. Furthermore, when the host platform 420 has achieved a finally trained model, the resulting model itself may be stored on the blockchain 110.

After the model has been trained, it may be deployed to a live environment where it can make digital media data-related predictions/decisions based on the execution of the final trained machine learning model using the verification parameters. In this example, data fed back from the asset 430 may be input into the machine learning model and may be used to make event predictions such as most accurate media data verification parameters. Determinations made by the execution of the machine learning model (e.g., verdicts or recommendations or verification parameters, etc.) at the host platform 420 may be stored on the blockchain 110 to provide auditable/verifiable proof. As one non-limiting example, the machine learning model may predict a future change of a part of the asset 430 (the verification parameters). The data behind this decision may be stored by the host platform 420 on the blockchain 110.

As discussed above, in one embodiment, the features and/or the actions described and/or depicted herein can occur on or with respect to the blockchain 110. The above embodiments of the present disclosure may be implemented in hardware, in computer-readable instructions executed by a processor, in firmware, or in a combination of the above. The computer computer-readable instructions may be embodied on a computer-readable medium, such as a storage medium. For example, the computer computer-readable instructions may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative embodiment, the processor and the storage medium may reside as discrete components. For example, FIG. 5 illustrates an example computing device (e.g., a server node) 500, which may represent or be integrated in any of the above-described components, etc.

Figure 5:
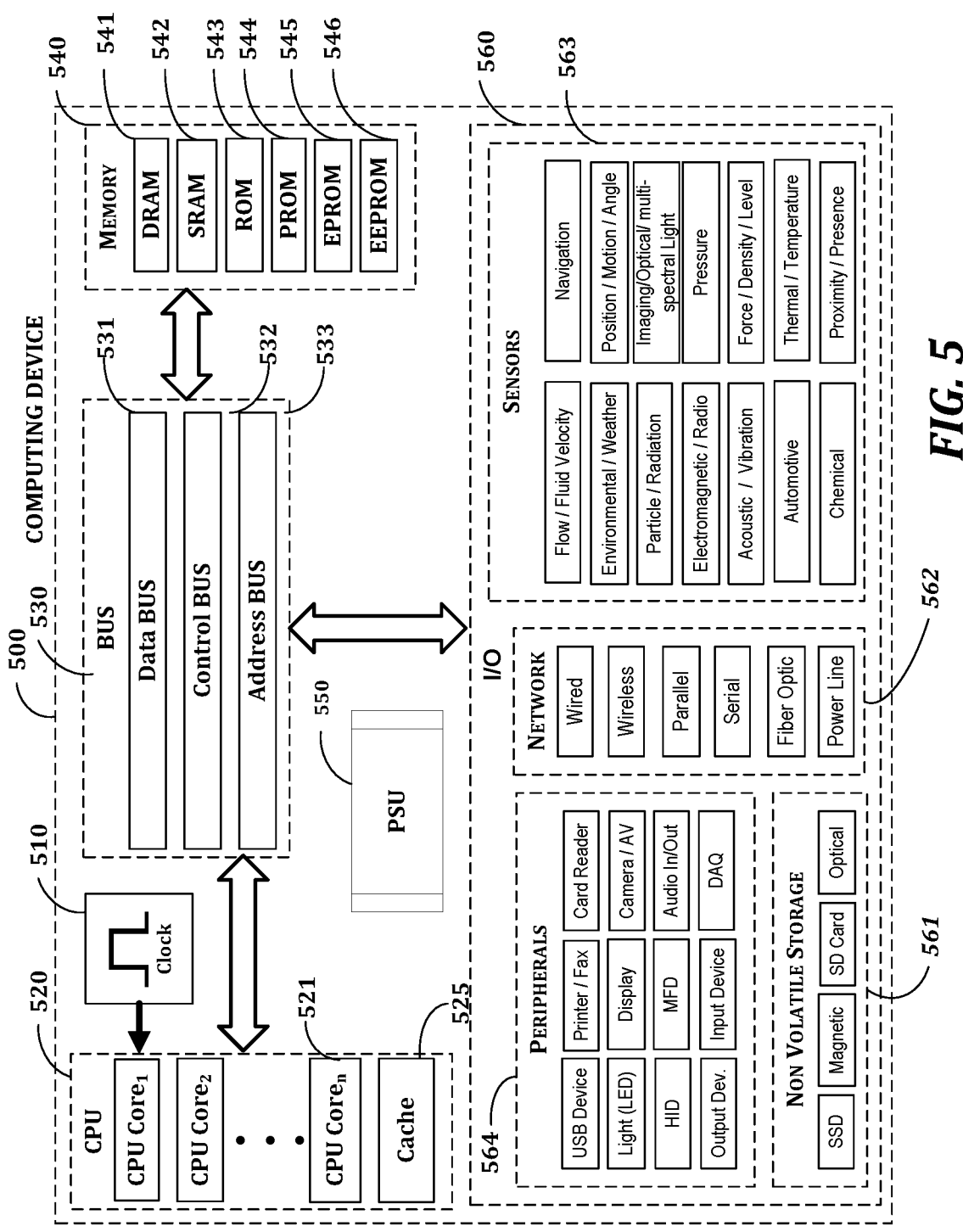
FIG. 5 illustrates a block diagram of a system including a computing device for performing the method of FIGS. 3A and 3B.

FIG. 5 illustrates a block diagram of a system including computing device 500. The computing device 500 may comprise, but not be limited to the following:

Mobile computing device, such as, but is not limited to, a laptop, a tablet, a smartphone, a drone, a wearable, an embedded device, a handheld device, an Arduino, an industrial device, or a remotely operable recording device;

A supercomputer, an exa-scale supercomputer, a mainframe, or a quantum computer;

A minicomputer, wherein the minicomputer computing device comprises, but is not limited to, an IBM AS500/iSeries/System I, A DEC VAX/PDP, a HP3000, a Honeywell-Bull DPS, a Texas Instruments TI-990, or a Wang Laboratories VS Series;

A microcomputer, wherein the microcomputer computing device comprises, but is not limited to, a server, wherein a server may be rack mounted, a workstation, an industrial device, a raspberry pi, a desktop, or an embedded device;

The TMO node 102 (see FIG. 2) may be hosted on a centralized server or on a cloud computing service. Although method 300 has been described to be performed by the TMO node 102 implemented on a computing device 500, it should be understood that, in some embodiments, different operations may be performed by a plurality of the computing devices 500 in operative communication at least one network.

Embodiments of the present disclosure may comprise a computing device having a central processing unit (CPU) 520, a bus 530, a memory unit 550, a power supply unit (PSU) 550, and one or more Input/Output (I/O) units. The CPU 520 coupled to the memory unit 550 and the plurality of I/O units 560 via the bus 530, all of which are powered by the PSU 550. It should be understood that, in some embodiments, each disclosed unit may actually be a plurality of such units for the purposes of redundancy, high availability, and/or performance. The combination of the presently disclosed units is configured to perform the stages of any method disclosed herein.

Consistent with an embodiment of the disclosure, the aforementioned CPU 520, the bus 530, the memory unit 550, a PSU 550, and the plurality of I/O units 560 may be implemented in a computing device, such as computing device 500. Any suitable combination of hardware, software, or firmware may be used to implement the aforementioned units. For example, the CPU 520, the bus 530, and the memory unit 550 may be implemented with computing device 500 or any of other computing devices 500, in combination with computing device 500. The aforementioned system, device, and components are examples and other systems, devices, and components may comprise the aforementioned CPU 520, the bus 530, the memory unit 550, consistent with embodiments of the disclosure.

At least one computing device 500 may be embodied as any of the computing elements illustrated in all of the attached figures, including the TMO node 102 (FIG. 2). A computing device 500 does not need to be electronic, nor even have a CPU 520, nor bus 530, nor memory unit 550. The definition of the computing device 500 to a person having ordinary skill in the art is "A device that computes, especially a programmable [usually] electronic machine that performs high-speed mathematical or logical operations or that assembles, stores, correlates, or otherwise processes information." Any device which processes information qualifies as a computing device 500, especially if the processing is purposeful.

With reference to FIG. 5, a system consistent with an embodiment of the disclosure may include a computing device, such as computing device 500. In a basic configuration, computing device 500 may include at least one clock module 510, at least one CPU 520, at least one bus 530, and at least one memory unit 550, at least one PSU 550, and at least one I/O 560 module, wherein I/O module may be comprised of, but not limited to a non-volatile storage sub-module 561, a communication sub-module 562, a sensors sub-module 563, and a peripherals sub-module 565.

A system consistent with an embodiment of the disclosure the computing device 500 may include the clock module 510 may be known to a person having ordinary skill in the art as a clock generator, which produces clock signals. Clock signal is a particular type of signal that oscillates between a high and a low state and is used like a metronome to coordinate actions of digital circuits. Most integrated circuits (ICs) of sufficient complexity use a clock signal in order to synchronize different parts of the circuit, cycling at a rate slower than the worst-case internal propagation delays. The preeminent example of the aforementioned integrated circuit is the CPU 520, the central component of modern computers, which relies on a clock. The only exceptions are asynchronous circuits such as asynchronous CPUs. The clock 510 can comprise a plurality of embodiments, such as, but not limited to, single-phase clock which transmits all clock signals on effectively 1 wire, two-phase clock which distributes clock signals on two wires, each with non-overlapping pulses, and four-phase clock which distributes clock signals on 5 wires.

Many computing devices 500 use a "clock multiplier" which multiplies a lower frequency external clock to the appropriate clock rate of the CPU 520. This allows the CPU 520 to operate at a much higher frequency than the rest of the computer, which affords performance gains in situations where the CPU 520 does not need to wait on an external factor (like memory 550 or input/output 560). Some embodiments of the clock 510 may include dynamic frequency change, where the time between clock edges can vary widely from one edge to the next and back again.

A system consistent with an embodiment of the disclosure the computing device 500 may include the CPU unit 520 comprising at least one CPU Core 521. A plurality of CPU cores 521 may comprise identical CPU cores 521, such as, but not limited to, homogeneous multi-core systems. It is also possible for the plurality of CPU cores 521 to comprise different CPU cores 521, such as, but not limited to, heterogeneous multi-core systems, big.LITTLE systems and some AMD accelerated processing units (APU). The CPU unit 520 reads and executes program instructions which may be used across many application domains, for example, but not limited to, general purpose computing, embedded computing, network computing, digital signal processing (DSP), and graphics processing (GPU). The CPU unit 520 may run multiple instructions on separate CPU cores 521 at the same time. The CPU unit 520 may be integrated into at least one of a single integrated circuit die and multiple dies in a single chip package. The single integrated circuit die and multiple dies in a single chip package may contain a plurality of other aspects of the computing device 500, for example, but not limited to, the clock 510, the CPU 520, the bus 530, the memory 550, and I/O 560.

The CPU unit 520 may contain cache 522 such as, but not limited to, a level 1 cache, level 2 cache, level 3 cache or combination thereof. The aforementioned cache 522 may or may not be shared amongst a plurality of CPU cores 521. The cache 522 sharing comprises at least one of message passing and inter-core communication methods may be used for the at least one CPU Core 521 to communicate with the cache 522. The inter-core communication methods may comprise, but not limited to, bus, ring, two-dimensional mesh, and crossbar. The aforementioned CPU unit 520 may employ symmetric multiprocessing (SMP) design.

The plurality of the aforementioned CPU cores 521 may comprise soft microprocessor cores on a single field programmable gate array (FPGA), such as semiconductor intellectual property cores (IP Core). The plurality of CPU cores 521 architecture may be based on at least one of, but not limited to, Complex instruction set computing (CISC), Zero instruction set computing (ZISC), and Reduced instruction set computing (RISC). At least one of the performance-enhancing methods may be employed by the plurality of the CPU cores 521, for example, but not limited to Instruction-level parallelism (ILP) such as, but not limited to, super-scalar pipelining, and Thread-level parallelism (TLP).

Consistent with the embodiments of the present disclosure, the aforementioned computing device 500 may employ a communication system that transfers data between components inside the aforementioned computing device 500, and/or the plurality of computing devices 500. The aforementioned communication system will be known to a person having ordinary skill in the art as a bus 530. The bus 530 may embody internal and/or external plurality of hardware and software components, for example, but not limited to a wire, optical fiber, communication protocols, and any physical arrangement that provides the same logical function as a parallel electrical bus. The bus 530 may comprise at least one of, but not limited to a parallel bus, wherein the parallel bus carry data words in parallel on multiple wires, and a serial bus, wherein the serial bus carry data in bit-serial form. The bus 530 may embody a plurality of topologies, for example, but not limited to, a multidrop/electrical parallel topology, a daisy chain topology, and a connected by switched hubs, such as USB bus. The bus 530 may comprise a plurality of embodiments, for example, but not limited to:

Internal data bus (data bus) 531/Memory bus
Control bus 532
Address bus 533
System Management Bus (SMBus)
Front-Side-Bus (FSB)
External Bus Interface (EBI)
Local bus
Expansion bus
Lightning bus
Controller Area Network (CAN bus)
Camera Link
ExpressCard
Advanced Technology management Attachment (ATA), including embodiments and derivatives such as, but not limited to, Integrated Drive Electronics (IDE)/Enhanced IDE (EIDE), ATA Packet Interface (ATAPI), Ultra-Direct Memory Access (UDMA), Ultra ATA (UATA)/Parallel ATA (PATA)/Serial ATA (SATA), CompactFlash (CF) interface, Consumer Electronics ATA (CE-ATA)/Fiber Attached Technology Adapted (FATA), Advanced Host Controller Interface (AHCI), SATA Express (SATAe)/External SATA (eSATA), including the powered embodiment eSATAp/Mini-SATA (mSATA), and Next Generation Form Factor (NGFF)/M.2.
Small Computer System Interface (SCSI)/Serial Attached SCSI (SAS)
HyperTransport
InfiniBand
RapidIO
Mobile Industry Processor Interface (MIPI)
Coherent Processor Interface (CAPI)
Plug-n-play
1-Wire
Peripheral Component Interconnect (PCI), including embodiments such as, but not limited to, Accelerated Graphics Port (AGP), Peripheral Component Interconnect extended (PCI-X), Peripheral Component Interconnect Express (PCI-e) (e.g., PCI Express Mini Card, PCI Express M.2 [Mini PCIe v2], PCI Express External Cabling [ePCIe], and PCI Express OCuLink [Optical Copper {Cu} Link]), Express Card, AdvancedTCA, AMC, Universal IO, Thunderbolt/Mini DisplayPort, Mobile PCIe (M-PCIe), U.2, and Non-Volatile Memory Express (NVMe)/Non-Volatile Memory Host Controller Interface Specification (NVMHCIS).

Industry Standard Architecture (ISA), including embodiments such as, but not limited to Extended ISA (EISA), PC/XT-bus/PC/AT-bus/PC/105 bus (e.g., PC/105-Plus, PCI/105-Express, PCI/105, and PCI-105), and Low Pin Count (LPC).

Music Instrument Digital Interface (MIDI)

Universal Serial Bus (USB), including embodiments such as, but not limited to, Media Transfer Protocol (MTP)/ Mobile High-Definition Link (MHL), Device Firmware Upgrade (DFU), wireless USB, InterChip USB, IEEE 1395 Interface/Firewire, Thunderbolt, and extensible Host Controller Interface (xHCI).

Consistent with the embodiments of the present disclosure, the aforementioned computing device 500 may employ hardware integrated circuits that store information for immediate use in the computing device 500, known to the person having ordinary skill in the art as primary storage or memory 550. The memory 550 operates at high speed, distinguishing it from the non-volatile storage sub-module 561, which may be referred to as secondary or tertiary storage, which provides slow-to-access information but offers higher capacities at lower cost. The contents contained in memory 550, may be transferred to secondary storage via techniques such as, but not limited to, virtual memory and swap. The memory 550 may be associated with addressable semiconductor memory, such as integrated circuits consisting of silicon-based transistors, used for example as primary storage but also other purposes in the computing device 500. The memory 550 may comprise a plurality of embodiments, such as, but not limited to volatile memory, non-volatile memory, and semi-volatile memory. It should be understood by a person having ordinary skill in the art that the ensuing are non-limiting examples of the aforementioned memory:

Volatile memory which requires power to maintain stored information, for example, but not limited to, Dynamic Random-Access Memory (DRAM) 551, Static Random-Access Memory (SRAM) 552, CPU Cache memory 525, Advanced Random-Access Memory (A-RAM), and other types of primary storage such as Random-Access Memory (RAM).

Non-volatile memory which can retain stored information even after power is removed, for example, but not limited to, Read-Only Memory (ROM) 553, Programmable ROM (PROM) 555, Erasable PROM (EPROM) 555, Electrically Erasable PROM (EEPROM) 556 (e.g., flash memory and Electrically Alterable PROM [EAPROM]), Mask ROM (MROM), One Time Programmable (OTP) ROM/Write Once Read Many (WORM), Ferroelectric RAM (FeRAM), Parallel Random-Access Machine (PRAM), Split-Transfer Torque RAM (STT-RAM), Silicon Oxime Nitride Oxide Silicon (SONOS), Resistive RAM (RRAM), Nano RAM (NRAM), 3D XPoint, Domain-Wall Memory (DWM), and millipede memory.

Semi-volatile memory which may have some limited non-volatile duration after power is removed but loses data after said duration has passed. Semi-volatile memory provides high performance, durability, and other valuable characteristics typically associated with volatile memory, while providing some benefits of true non-volatile memory. The semi-volatile memory may comprise volatile and non-volatile memory and/or volatile memory with battery to provide power after power is removed. The semi-volatile memory may comprise, but not limited to spin-transfer torque RAM (STT-RAM).

Consistent with the embodiments of the present disclosure, the aforementioned computing device 500 may employ the communication system between an information processing system, such as the computing device 500, and the outside world, for example, but not limited to, human, environment, and another computing device 500. The aforementioned communication system will be known to a person having ordinary skill in the art as I/O 560. The I/O module 560 regulates a plurality of inputs and outputs with regard to the computing device 500, wherein the inputs are a plurality of signals and data received by the computing device 500, and the outputs are the plurality of signals and data sent from the computing device 500. The I/O module 560 interfaces a plurality of hardware, such as, but not limited to, non-volatile storage 561, communication devices 562, sensors 563, and peripherals 565. The plurality of hardware is used by at least one of, but not limited to, human, environment, and another computing device 500 to communicate with the present computing device 500. The I/O module 560 may comprise a plurality of forms, for example, but not limited to channel I/O, port mapped I/O, asynchronous I/O, and Direct Memory Access (DMA).

Consistent with the embodiments of the present disclosure, the aforementioned computing device 500 may employ the non-volatile storage sub-module 561, which may be referred to by a person having ordinary skill in the art as one of secondary storage, external memory, tertiary storage, off-line storage, and auxiliary storage. The non-volatile storage sub-module 561 may not be accessed directly by the CPU 520 without using an intermediate area in the memory 550. The non-volatile storage sub-module 561 does not lose data when power is removed and may be two orders of magnitude less costly than storage used in memory modules, at the expense of speed and latency. The non-volatile storage sub-module 561 may comprise a plurality of forms, such as, but not limited to, Direct Attached Storage (DAS), Network Attached Storage (NAS), Storage Area Network (SAN), nearline storage, Massive Array of Idle Disks (MAID), Redundant Array of Independent Disks (RAID), device mirroring, off-line storage, and robotic storage. The non-volatile storage sub-module (561) may comprise a plurality of embodiments, such as, but not limited to:

Optical storage, for example, but not limited to, Compact Disk (CD) (CD-ROM/CD-R/CD-RW), Digital Versatile Disk (DVD) (DVD-ROM/DVD-R/DVD+R/DVD-RW/DVD+RW/DVD±RW/DVD+R DL/DVD-RAM/ HD-DVD), Blu-ray Disk (BD) (BD-ROM/BD-R/BD-RE/BD-R DL/BD-RE DL), and Ultra-Density Optical (UDO).

Semiconductor storage, for example, but not limited to, flash memory, such as, but not limited to, USB flash drive, Memory card, Subscriber Identity Module (SIM) card, Secure Digital (SD) card, Smart Card, Compact-Flash (CF) card, Solid-State Drive (SSD) and memristor.

Magnetic storage such as, but not limited to, Hard Disk Drive (HDD), tape drive, carousel memory, and Card Random-Access Memory (CRAM).

Phase-change memory

Holographic data storage such as Holographic Versatile Disk (HVD).

Molecular Memory

Deoxyribonucleic Acid (DNA) digital data storage

Consistent with the embodiments of the present disclosure, the aforementioned computing device 500 may employ the communication sub-module 562 as a subset of the I/O 560, which may be referred to by a person having ordinary skill in the art as at least one of, but not limited to, computer network, data network, and network. The network allows computing devices 500 to exchange data using connections, which may be known to a person having ordinary skill in the art as data links, between network nodes. The nodes comprise network computer devices 500 that originate, route, and terminate data. The nodes are identified by network addresses and can include a plurality of hosts consistent with the embodiments of a computing device 500. The aforementioned embodiments include, but not limited to personal computers, phones, servers, drones, and networking devices such as, but not limited to, hubs, switches, routers, modems, and firewalls.

Two nodes can be networked together, when one computing device 500 is able to exchange information with the other computing device 500, whether or not they have a direct connection with each other. The communication sub-module 562 supports a plurality of applications and services, such as, but not limited to World Wide Web (WWW), digital video and audio, shared use of application and storage computing devices 500, printers/scanners/fax machines, email/online chat/instant messaging, remote control, distributed computing, etc. The network may comprise a plurality of transmission mediums, such as, but not limited to conductive wire, fiber optics, and wireless. The network may comprise a plurality of communications protocols to organize network traffic, wherein application-specific communications protocols are layered, may be known to a person having ordinary skill in the art as carried as payload, over other more general communications protocols. The plurality of communications protocols may comprise, but not limited to, IEEE 802, ethernet, Wireless LAN (WLAN/Wi-Fi), Internet Protocol (IP) suite (e.g., TCP/IP, UDP, Internet Protocol version 5 [IPv5], and Internet Protocol version 6 [IPv6]), Synchronous Optical Networking (SONET)/Synchronous Digital Hierarchy (SDH), Asynchronous Transfer Mode (ATM), and cellular standards (e.g., Global System for Mobile Communications [GSM], General Packet Radio Service [GPRS], Code-Division Multiple Access [CDMA], and Integrated Digital Enhanced Network [IDEN]).

The communication sub-module 562 may comprise a plurality of size, topology, traffic control mechanism and organizational intent. The communication sub-module 562 may comprise a plurality of embodiments, such as, but not limited to:

Wired communications, such as, but not limited to, coaxial cable, phone lines, twisted pair cables (ethernet), and InfiniBand.

Wireless communications, such as, but not limited to, communications satellites, cellular systems, radio frequency/spread spectrum technologies, IEEE 802.11 Wi-Fi, Bluetooth, NFC, free-space optical communications, terrestrial microwave, and Infrared (IR) communications. Cellular systems embody technologies such as, but not limited to, 3G, 5G (such as WiMax and LTE), and 5G (short and long wavelength).

Parallel communications, such as, but not limited to, LPT ports.

Serial communications, such as, but not limited to, RS-232 and USB.

Fiber Optic communications, such as, but not limited to, Single-mode optical fiber (SMF) and Multi-mode optical fiber (MMF).

Power Line and wireless communications

The aforementioned network may comprise a plurality of layouts, such as, but not limited to, bus network such as ethernet, star network such as Wi-Fi, ring network, mesh network, fully connected network, and tree network. The network can be characterized by its physical capacity or its organizational purpose. Use of the network, including user authorization and access rights, differ accordingly. The characterization may include, but not limited to nanoscale network, Personal Area Network (PAN), Local Area Network (LAN), Home Area Network (HAN), Storage Area Network (SAN), Campus Area Network (CAN), backbone network, Metropolitan Area Network (MAN), Wide Area Network (WAN), enterprise private network, Virtual Private Network (VPN), and Global Area Network (GAN).

Consistent with the embodiments of the present disclosure, the aforementioned computing device 500 may employ the sensors sub-module 563 as a subset of the I/O 560. The sensors sub-module 563 comprises at least one of the devices, modules, and subsystems whose purpose is to detect events or changes in its environment and send the information to the computing device 500. Sensors are sensitive to the measured property, are not sensitive to any property not measured, but may be encountered in its application, and do not significantly influence the measured property. The sensors sub-module 563 may comprise a plurality of digital devices and analog devices, wherein if an analog device is used, an Analog to Digital (A-to-D) converter must be employed to interface the said device with the computing device 500. The sensors may be subject to a plurality of deviations that limit sensor accuracy. The sensors sub-module 563 may comprise a plurality of embodiments, such as, but not limited to, chemical sensors, automotive sensors, acoustic/sound/vibration sensors, electric current/electric potential/magnetic/radio sensors, environmental/weather/moisture/humidity sensors, flow/fluid velocity sensors, ionizing radiation/particle sensors, navigation sensors, position/angle/displacement/distance/speed/acceleration sensors, imaging/optical/light sensors, pressure sensors, force/density/level sensors, thermal/temperature sensors, and proximity/presence sensors. It should be understood by a person having ordinary skill in the art that the ensuing are non-limiting examples of the aforementioned sensors:

Chemical sensors, such as, but not limited to, breathalyzer, carbon dioxide sensor, carbon monoxide/smoke detector, catalytic bead sensor, chemical field-effect transistor, chemiresistor, electrochemical gas sensor, electronic nose, electrolyte-insulator-semiconductor sensor, energy-dispersive X-ray spectroscopy, fluorescent chloride sensors, holographic sensor, hydrocarbon dew point analyzer, hydrogen sensor, hydrogen sulfide sensor, infrared point sensor, ion-selective electrode, nondispersive infrared sensor, microwave chemistry sensor, nitrogen oxide sensor, olfactometer, optode, oxygen sensor, ozone monitor, pellistor, pH glass electrode, potentiometric sensor, redox electrode, zinc oxide nanorod sensor, and biosensors (such as nano-sensors).

Automotive sensors, such as, but not limited to, air flow meter/mass airflow sensor, air-fuel ratio meter, AFR sensor, blind spot monitor, engine coolant/exhaust gas/cylinder head/transmission fluid temperature sensor, hall effect sensor, wheel/automatic transmission/turbine/vehicle speed sensor, airbag sensors, brake fluid/engine crankcase/fuel/oil/tire pressure sensor, camshaft/crankshaft/throttle position sensor, fuel/oil level sensor, knock sensor, light sensor, MAP sensor, oxygen sensor (02), parking sensor, radar sensor, torque sensor, variable reluctance sensor, and water-in-fuel sensor.

Acoustic, sound and vibration sensors, such as, but not limited to, microphone, lace sensor (guitar pickup), seismometer, sound locator, geophone, and hydrophone.

Electric current, electric potential, magnetic, and radio sensors, such as, but not limited to, current sensor, Daly detector, electroscope, electron multiplier, faraday cup, galvanometer, hall effect sensor, hall probe, magnetic anomaly detector, magnetometer, magnetoresistance, MEMS magnetic field sensor, metal detector, planar hall sensor, radio direction finder, and voltage detector.

Environmental, weather, moisture, and humidity sensors, such as, but not limited to, actinometer, air pollution sensor, bedwetting alarm, ceilometer, dew warning, electrochemical gas sensor, fish counter, frequency domain sensor, gas detector, hook gauge evaporimeter, humistor, hygrometer, leaf sensor, lysimeter, pyranometer, pyrgeometer, psychrometer, rain gauge, rain sensor, seismometers, SNOTEL, snow gauge, soil moisture sensor, stream gauge, and tide gauge.

Flow and fluid velocity sensors, such as, but not limited to, air flow meter, anemometer, flow sensor, gas meter, mass flow sensor, and water meter.

Ionizing radiation and particle sensors, such as, but not limited to, cloud chamber, Geiger counter, Geiger-Muller tube, ionization chamber, neutron detection, proportional counter, scintillation counter, semiconductor detector, and thermos-luminescent dosimeter.

Navigation sensors, such as, but not limited to, air speed indicator, altimeter, attitude indicator, depth gauge, fluxgate compass, gyroscope, inertial navigation system, inertial reference unit, magnetic compass, MHD sensor, ring laser gyroscope, turn coordinator, variometer, vibrating structure gyroscope, and yaw rate sensor.

Position, angle, displacement, distance, speed, and acceleration sensors, such as, but not limited to, accelerometer, displacement sensor, flex sensor, free fall sensor, gravimeter, impact sensor, laser rangefinder, LIDAR, odometer, photoelectric sensor, position sensor such as, but not limited to, GPS or Glonass, angular rate sensor, shock detector, ultrasonic sensor, tilt sensor, tachometer, ultra-wideband radar, variable reluctance sensor, and velocity receiver.

Imaging, optical and light sensors, such as, but not limited to, CMOS sensor, LIDAR, multi-spectral light sensor, colorimeter, contact image sensor, electro-optical sensor, infra-red sensor, kinetic inductance detector, LED as light sensor, light-addressable potentiometric sensor, Nichols radiometer, fiber-optic sensors, optical position sensor, thermopile laser sensor, photodetector, photodiode, photomultiplier tubes, phototransistor, photoelectric sensor, photoionization detector, photomultiplier, photoresistor, photoswitch, phototube, scintillometer, Shack-Hartmann, single-photon avalanche diode, superconducting nanowire single-photon detector, transition edge sensor, visible light photon counter, and wavefront sensor.

Pressure sensors, such as, but not limited to, barograph, barometer, boost gauge, bourdon gauge, hot filament ionization gauge, ionization gauge, McLeod gauge, Oscillating U-tube, permanent downhole gauge, piezometer, Pirani gauge, pressure sensor, pressure gauge, tactile sensor, and time pressure gauge.

Force, Density, and Level sensors, such as, but not limited to, bhangmeter, hydrometer, force gauge or force sensor, level sensor, load cell, magnetic level or nuclear density sensor or strain gauge, piezo capacitive pressure sensor, piezoelectric sensor, torque sensor, and viscometer.

Thermal and temperature sensors, such as, but not limited to, bolometer, bimetallic strip, calorimeter, exhaust gas temperature gauge, flame detection/pyrometer, Gardon gauge, Golay cell, heat flux sensor, microbolometer, microwave radiometer, net radiometer, infrared/quartz/resistance thermometer, silicon bandgap temperature sensor, thermistor, and thermocouple.

Proximity and presence sensors, such as, but not limited to, alarm sensor, doppler radar, motion detector, occupancy sensor, proximity sensor, passive infrared sensor, reed switch, stud finder, triangulation sensor, touch switch, and wired glove.

Consistent with the embodiments of the present disclosure, the aforementioned computing device 500 may employ the peripherals sub-module 562 as a subset of the I/O 560. The peripheral sub-module 565 comprises ancillary devices used to put information into and get information out of the computing device 500. There are 3 categories of devices comprising the peripheral sub-module 565, which exist based on their relationship with the computing device 500, input devices, output devices, and input/output devices. Input devices send at least one of data and instructions to the computing device 500. Input devices can be categorized based on, but not limited to:

Modality of input, such as, but not limited to, mechanical motion, audio, visual, and tactile.

Whether the input is discrete, such as but not limited to, pressing a key, or continuous such as, but not limited to position of a mouse.

The number of degrees of freedom involved, such as, but not limited to, two-dimensional mice vs three-dimensional mice used for Computer-Aided Design (CAD) applications.

Output devices provide output from the computing device 500. Output devices convert electronically generated information into a form that can be presented to humans. Input/output devices that perform both input and output functions. It should be understood by a person having ordinary skill in the art that the ensuing are non-limiting embodiments of the aforementioned peripheral sub-module 565:

Input Devices

Human Interface Devices (HID), such as, but not limited to, pointing device (e.g., mouse, touchpad, joystick, touchscreen, game controller/gamepad, remote, light pen, light gun, Wii remote, jog dial, shuttle, and knob), keyboard, graphics tablet, digital pen, gesture recognition devices, magnetic ink character recognition, Sip-and-Puff (SNP) device, and Language Acquisition Device (LAD).

High degree of freedom devices, that require up to six degrees of freedom such as, but not limited to, camera gimbals, Cave Automatic Virtual Environment (CAVE), and virtual reality systems.

Video Input devices are used to digitize images or video from the outside world into the computing device 500. The information can be stored in a multitude of formats depending on the user's requirement. Examples of types of video input devices include, but not limited to, digital camera, digital camcorder, portable media player, webcam, Microsoft Kinect, image scanner, fingerprint scanner, barcode reader, 3D scanner, laser rangefinder, eye gaze tracker, computed tomography, magnetic resonance imaging, positron emission tomography, medical ultrasonography, TV tuner, and iris scanner.

Audio input devices are used to capture sound. In some cases, an audio output device can be used as an input device, in order to capture produced sound. Audio input devices allow a user to send audio signals to the computing device 500 for at least one of processing, recording, and carrying out commands. Devices such as microphones allow users to speak to the computer in order to record a voice message or navigate software. Aside from recording, audio input devices are also used with speech recognition software. Examples of types of audio input devices include, but not limited to microphone, Musical Instrument Digital Interface (MIDI) devices such as, but not limited to a keyboard, and headset.

Data Acquisition (DAQ) devices convert at least one of analog signals and physical parameters to digital values for processing by the computing device 500. Examples of DAQ devices may include, but not limited to, Analog to Digital Converter (ADC), data logger, signal conditioning circuitry, multiplexer, and Time to Digital Converter (TDC).

Output Devices may further comprise, but not be limited to:

Display devices, which convert electrical information into visual form, such as, but not limited to, monitor, TV, projector, and Computer Output Microfilm (COM). Display devices can use a plurality of underlying technologies, such as, but not limited to, Cathode-Ray Tube (CRT), Thin-Film Transistor (TFT), Liquid Crystal Display (LCD), Organic Light-Emitting Diode (OLED), MicroLED, E Ink Display (ePaper) and Refreshable Braille Display (Braille Terminal).

Printers, such as, but not limited to, inkjet printers, laser printers, 3D printers, solid ink printers and plotters.

Audio and Video (AV) devices, such as, but not limited to, speakers, headphones, amplifiers and lights, which include lamps, strobes, DJ lighting, stage lighting, architectural lighting, special effect lighting, and lasers.

Other devices such as Digital to Analog Converter (DAC)

Input/Output Devices may further comprise, but not be limited to, touchscreens, networking device (e.g., devices disclosed in network 562 sub-module), data storage device (non-volatile storage 561), facsimile (FAX), and graphics/sound cards.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as examples for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

What is claimed is:

1. A system for trusted media origination, comprising:

a processor of a trusted media originator node communicatively connected to at least one media source; and a memory on which are stored machine-readable instructions that when executed by the processor, cause the processor to:

acquire a media data instance from at least one media source;

determine an identity of at least one Participating Actor in an origination event associated with the media data instance, the Participating Actor comprising at least one of a capture device, an editing tool or service, or a human operator;

verify the identity of the at least one Participating Actor in the origination event;

generate a certificate representing the verified identity of the at least one Participating Actor;

derive a plurality of features from the origination event, the verified identity of the at least one Participating Actor, and attributes and state of the media data instance including an Origination Event Classification, Context attributes, a role of each Participating Actor, and a condensed value representing contents of the media data instance computed using a cryptographic digest;

generate predictive verification parameters based on media event journal-related data and historical trusted media data;

verify the plurality of the derived features according to the predictive verification parameters;

generate an origination event record data based on the verified plurality of the derived features;

for each creation or modification of the media data instance, compute a cryptographic digest of the then-current contents, bind that digest to an origination event record identifying the editing device or tool, and require a digital signature produced using an identification certificate of the editing device or tool, the origination event records being appended in sequence in a media event journal;

encode at least a portion of the origination event record data using an identification certificate of the at least one Participating Actor and record a signature of the Participating Actor bound to the identification certificate, wherein each origination event record corresponding to a creation or modification is certified by a signature bound to the identification certificate of its respective Participating Actor;

create, when absent, the media event journal by executing a smart contract on a permissioned blockchain in accordance with an endorsement policy;

acquire a media event journal corresponding to the media data instance; and enter the origination event record data and the identity of the at least one Participating Actor into the media event journal.

2. The system of claim 1, wherein the instructions further cause the processor to acquire the media event journal corresponding to the media data instance and identities of Participating Actors in each of origination event records logged in the media event journal.

3. The system of claim 2, wherein the instructions further cause the processor to decode at least one of the origination event records using verified identities of the Participating Actors.

4. The system of claim 3, wherein the instructions further cause the processor to determine whether at least one of origination events corresponding to the origination event records logged in the media event journal has been created or modified by a process external to that of a trusted media originator node connected to the media data instance.

5. The system of claim 4, wherein the instructions further cause the processor to determine whether the media event journal or the media data instance has been modified by a process external to the trusted media originator node connected to the at least one media source associated with the media data instance.

6. The system of claim 5, wherein the instructions further cause the processor to determine and report veracity and integrity of media origination event records, the plurality of features comprising the records, the media event journal, and the media data instance with respect to contents of the media event journal.

7. The system of claim 1, wherein the instructions further cause the processor to retrieve an existing certificate representing the verified identity of the at least one Participating Actor.

8. The system of claim 1, wherein the instructions further cause the processor to create the media event journal corresponding to the media data instance.

9. The system of claim 1, wherein the instructions further cause the processor to generate the media event journal by executing a smart contract to store the origination event record data on a blockchain.

10. The system of claim 2, wherein each of the origination event records logged in the media event journal are certified by corresponding Participating Actors.

11. A method for trusted media origination, comprising:

acquiring, by a trusted media originator (TMO), a media data instance from at least one media source;

determining, by the TMO, an identity of at least one Participating Actor in an origination event associated with the media data instance, the Participating Actor comprising at least one of a capture device, an editing tool or service, or a human operator;

verifying, by the TMO, the identity of the at least one Participating Actor in the origination event;

generating, by the TMO, a certificate representing the verified identity of the at least one Participating Actor;

for each creation or modification of the media data instance, computing a cryptographic digest of the then-current contents, bind that digest to an origination event record identifying the editing device or tool, and require a digital signature produced using an identification certificate of the editing device or tool, the origination event records being appended in sequence in a media event journal;

deriving, by the TMO, a plurality of features from the origination event, the verified identity of the at least one Participating Actor, and attributes and state of the media data instance including an Origination Event Classification, Context attributes, Participating Actor roles, and a condensed value representing contents of the media data instance computed using a cryptographic digest;

generating, by the TMO, predictive verification parameters based on media event journal-related data and historical trusted media data;

verifying, by the TMO, the plurality of the derived features according to the predictive verification parameters;

generating, by the TMO, an origination event record data based on the verified plurality of the derived features;

encoding, by the TMO, at least a portion of the origination event record data using an identification certificate of the at least one Participating Actor and recording a signature of the Participating Actor bound to the identification certificate, wherein each origination event record corresponding to a creation or modification is certified by a signature bound to the identification certificate of its respective Participating Actor;

creating, when absent, and otherwise acquiring, by the TMO, a media event journal corresponding to the media data instance by executing a smart contract on a permissioned blockchain under an endorsement policy;

acquiring, by the TMO, a media event journal corresponding to the media data instance; and entering, by the TMO, the origination event record data and the identity of the at least one Participating Actor into the media event journal.

12. The method of claim 11, further comprising acquiring the media event journal corresponding to the media data instance and identities of Participating Actors in each of origination event records logged in the media event journal.

13. The method of claim 12, further comprising determining whether at least one of origination events corresponding to the origination event records logged in the media event journal has been created or modified by a process external to that of a trusted media originator node connected to the media data instance.

14. The method of claim 13, further comprising determine whether the media event journal or the media data instance has been modified by a process external to the TMO node connected to the at least one media source associated with the media data instance.

15. The method of claim 14, further comprising determining and reporting veracity and integrity of media origination event records, the plurality of features comprising the records, the media event journal, and the media data instance with respect to contents of the media event journal.

16. The method of claim 11, further comprising retrieving an existing certificate representing the verified identity of the at least one Participating Actor.

17. A non-transitory computer-readable medium comprising instructions, that when read by a processor, cause the processor to perform:

acquiring a media data instance from at least one media source;

determining an identity of at least one Participating Actor in an origination event associated with the media data instance, the Participating Actor comprising at least one of a capture device, an editing tool or service, or a human operator;

verifying the identity of the at least one Participating Actor in the origination event;

generating a certificate representing the verified identity of the at least one Participating Actor;

deriving a plurality of features from the origination event, the verified identity of the at least one Participating Actor, and attributes and state of the media data instance including an Origination Event Classification, Context attributes, Participating Actor roles, and a condensed value representing contents of the media data instance computed using a cryptographic digest;

generating predictive verification parameters based on media event journal-related data and historical trusted media data;

verifying the plurality of the derived features according to the predictive verification parameter;

generating an origination event record data based on the verified plurality of the derived features;

for each creation or modification of the media data instance, computing a cryptographic digest of the then-current contents, bind that digest to an origination event record identifying the editing device or tool, and require a digital signature produced using an identification certificate of the editing device or tool, the origination event records being appended in sequence in a media event journal;

encoding at least a portion of the origination event record data using an identification certificate of the at least one Participating Actor and recording a signature of the Participating Actor bound to the identification certificate, wherein each origination event record corresponding to a creation or modification is certified by a signature bound to the identification certificate of its respective Participating Actor;

creating, when absent, a media event journal by executing a smart contract on a permissioned blockchain under an endorsement policy;

acquiring a media event journal corresponding to the media data instance; and entering the origination event record data and the identity of the at least one Participating Actor into the media event journal.

18. The non-transitory computer readable medium of claim 17, further comprising acquiring the media event journal corresponding to the media data instance and identities of Participating Actors in each of origination event records logged in the media event journal.

19. The non-transitory computer readable medium of claim 18, further comprising determining whether at least one of origination events corresponding to the origination event records logged in the media event journal has been created or modified by a process external to that of a trusted media originator node connected to the media data instance.

20. The non-transitory computer readable medium of claim 17, further comprising retrieving an existing certificate representing the verified identity of the at least one Participating Actor.

* * * * *